(12) United States Patent
Avadhanula et al.

(10) Patent No.: US 8,046,751 B1
(45) Date of Patent: Oct. 25, 2011

(54) STRUCTURING UNSTRUCTURED REGIONS IN A CONTROL FLOW GRAPH

(75) Inventors: Srinath Avadhanula, Framingham, MA (US); Vijay Raghavan, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1231 days.

(21) Appl. No.: 11/653,058

(22) Filed: Jan. 11, 2007

(51) Int. Cl.
*G06F 9/44* (2006.01)

(52) U.S. Cl. ........ 717/156; 717/104; 717/106; 717/132; 717/144; 717/146; 717/159

(58) Field of Classification Search .................. None
See application file for complete search history.

(56) References Cited

U.S. PATENT DOCUMENTS

| | | | |
|---|---|---|---|
| 7,433,808 B1 | 10/2008 | Raghavan et al. | |
| 7,503,027 B1 | 3/2009 | Zhao et al. | |
| 7,720,656 B2 | 5/2010 | Raghavan et al. | |
| 2004/0073413 A1 | 4/2004 | Aberg et al. | |
| 2004/0154009 A1* | 8/2004 | Reynaud | 717/155 |
| 2006/0064680 A1* | 3/2006 | Devane | 717/140 |
| 2007/0018986 A1* | 1/2007 | Hauser | 345/440 |

OTHER PUBLICATIONS

Cifuentes, Cristina, "A Structuring Algorithm for Decompilation," Proceedings of the XIX Conferencia Latinoamericana de Informatica, Aug. 1993, pp. 267-276.*
Erosa, Ana M. and Laurie J. Hendren, "Taming Control Flow: A Structured Approach to Eliminating Goto Statements," Proceedings of the 1994 International Conference on Computer Languages, May 1994, pp. 229-240.*
Pan, Si and R. Geoff Dromey, "A Formal Basis for Removing Goto Statements," The Computer Journal, vol. 39, No. 3, 1996, pp. 203-214.*
Williams, M. H. and H. L. Ossher, "Conversion of Unstructured Flow Diagrams to Structured Form," The Computer Journal, vol. 21, No. 2, 1978, pp. 161-167.*
Sarkar, V., "Automatic selection of high-order transformations in the IBM XL Forran compilers," IBM J. Res. Develop., vol. 41(3):233-264 (1997).

* cited by examiner

*Primary Examiner* — Michael J Yigdall
(74) *Attorney, Agent, or Firm* — Nelson Mullins Riley & Scarborough LLP

(57) ABSTRACT

A control flow graph may be generated from a model. The control flow graph may be restructured by converting at least one unstructured region of a control flow graph into a structured region. The restructuring may include locating at least one block between two merge nodes in the control flow graph, moving the located block to a different section of the control flow graph, and creating the structured region by surrounding the moved code block with a test of a guard variable.

27 Claims, 22 Drawing Sheets

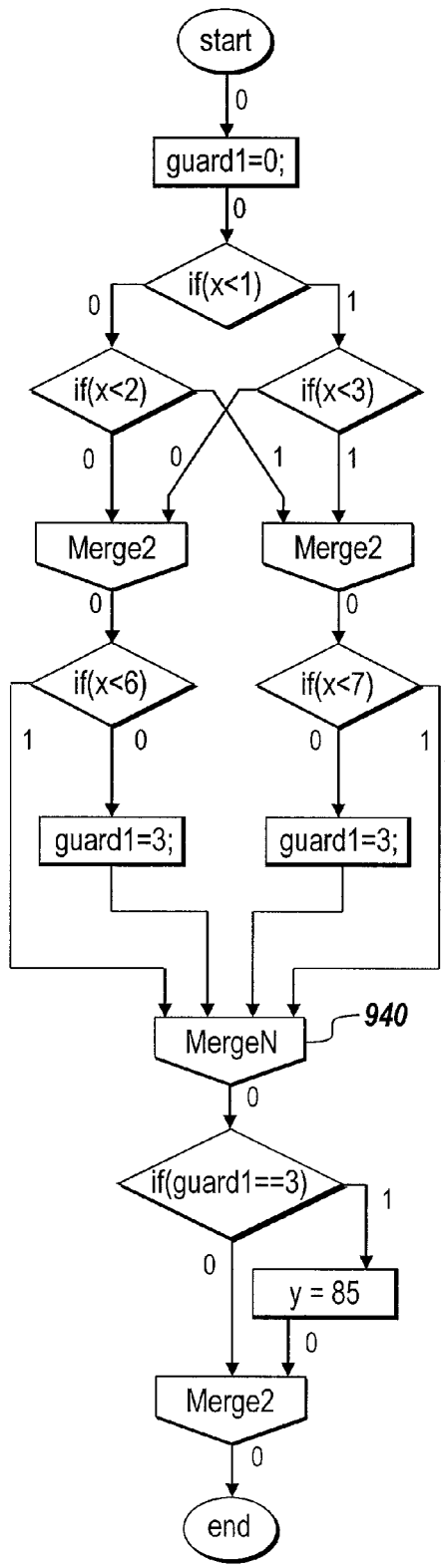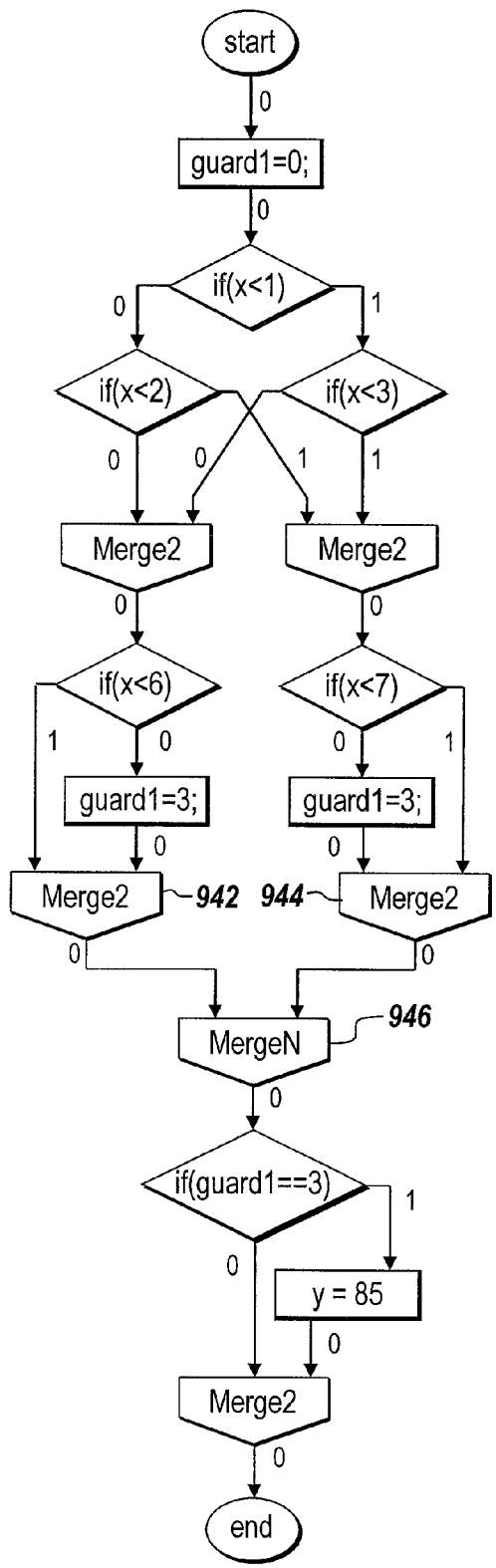
*Fig. 9C*   *Fig. 9D*

```
void c1_unstructured(void)
{
    if((boolean_T)c1 != 0) {          /* 1204 */
        a1();                          /* 1206 */
    } else {
        a2();                          /* 1216 */
        if((boolean_T)c3 != 0) {       /* 1208 */
            a3();                      /* 1220 */
        } else {
            a4();                      /* 1214 */
            goto label_1;              /* 1232 */
        }
    }                                  /* 1218 */
    a5();
    label_1:;                          /* 1234 */
    y = 10.0;                          /* 1236 */
}
```

*Fig. 12C*

```
void c1_unstructured(void)
{
    boolean_T guard1 = false;          ~1302
    guard1 = false;   ~1302
    if((boolean_T)c1 != 0) {           ~1204
        a1();  ~1206
        guard1 = true;                 }1306
    } else {
        a2();  ~1216
        if((boolean_T)c3 != 0) {       ~1208
            a3();  ~1220
            guard1 = true;             }1320
        } else {
            a4();  ~1214
        }
    }
    if(guard1 == true) {               ~1312
        a5();  ~1218
    }
    y = 10.0;   ~1236
}
```

*Fig. 13B*

STRUCTURING UNSTRUCTURED REGIONS IN A CONTROL FLOW GRAPH

BACKGROUND

Logic or structure of a software and/or hardware program or module may be represented as a control flow graph (CFG). A CFG is a directed graph, in which nodes represent computational statements, elements or expressions, and edges represent transfer of control between nodes. A control flow typically includes all possible execution paths, and each possible execution path of the module has a corresponding path from the entry to the exit node of the graph.

Control flow graphs may be represented graphically and/or textually, or as in-memory representations. There are numerous uses for control flow graphs: code optimization, compilation and interpretation, code visualization, static analysis, dynamic testing, etc. In general, a control flow graph is one of many possible representations of a software and/or hardware module. The CFG may be an intermediate representation, derived from the original representation, or the software or graphical code itself may represent a control flow graph.

A typical control flow graph may have a single entry node and a single exit node, with one or more paths in between, indicating possible flow of execution. Control flow graphs may be viewed as hierarchical—that is, a block in a single entry single exit (SESE) CFG may sometimes be represented as a SESE control flow graph. Conversely, a single entry single exit region of a CFG may be abstracted into one or more blocks in a larger CFG. Such hierarchical change of levels of representation is often used in compilation, optimization, static analysis, and other applications, where it may be useful to analyze a portion of the module at different levels of detail. In some cases, a compiler, optimizer or analyzer may make several paths through a CFG, creating blocks of out sub-graphs or subdividing blocks into SESE sub-graphs.

Control flow graphs may be expressed in a number of ways: graphically, textually or in a combination thereof. CFGs may be a final result of compilation or code generation, or they may be used for code generation. It is usual for an intermediate representation, used in code generation, compilation, execution or analysis, to be a representation of a control flow graph. Moreover, some assembly or hardware representations specifically represent a control flow graph. For example, a section of assembly-level code may be thought as a CFG.

SUMMARY

A control flow graph may be generated from a model. The control flow graph may be restructured by converting at least one unstructured region of a control flow graph into a structured region. An unstructured region is a region, which results in GOTO or similar constructs in generated code. The restructuring may include locating at least one block between two merge nodes in the control flow graph, moving the located block to a different section of the control flow graph, and creating the structured region by surrounding the moved code block with a test of a guard variable.

The guard variable may be a variable of various types, set to a predetermined value on every path that leads to the located code block in the control graph. The guard variable may be, for example, of boolean or integer type. The test of the guard variable that surrounds the moved code block may be the test for the predetermined value that is set on all paths that previously have led to the moved block. In languages, where variable initialization would be appropriate, the guard variable may be initialized to a value different from the predetermined value.

The identification of the at least one code block between the two merge nodes may be identification of an unstructured region of the control flow graph. The located code block may be moved below the lower of the two merge nodes. In one embodiment of the invention the two merge nodes may then be merged into a single merge node. In another embodiment of the invention, the resulting single merge node may then be split into two or more merge nodes using optimal merge splitting rules. The control flow graph may include single-entry single-exit nodes and merge nodes, or, in an alternative embodiment, it may be reorganized into such a graph.

The control flow graph with the at least one restructured region may be used to generate code. The generated code may be in a programming language, such as, for example, C, Java bytecode, Assembly, or it may be a hardware description language, such as HDL, or VHDL, which, in turn, may be used for generating FPGA descriptions, ASIC descriptions, etc. Alternatively, FPGA or ASIC descriptions may be generated directly from the code or from the model. The generated code may be used for model property proving, model analysis, software vs. hardware trade-offs analysis, simulation, verification or any other uses, as deemed appropriate by one of skill in the art.

BRIEF DESCRIPTION OF THE FIGURES

FIGS. 9A-D are schematic illustrations of possible reorganizations of another exemplary CFG.

FIGS. 12A-C illustrate a simple model, which results in an unstructured CFG and unstructured generated code.

FIGS. 13A-B illustrate the CFG and the generated code for the model of FIG. 12A after restructuring.

DETAILED DESCRIPTION OF THE INVENTION

Figure 1A:
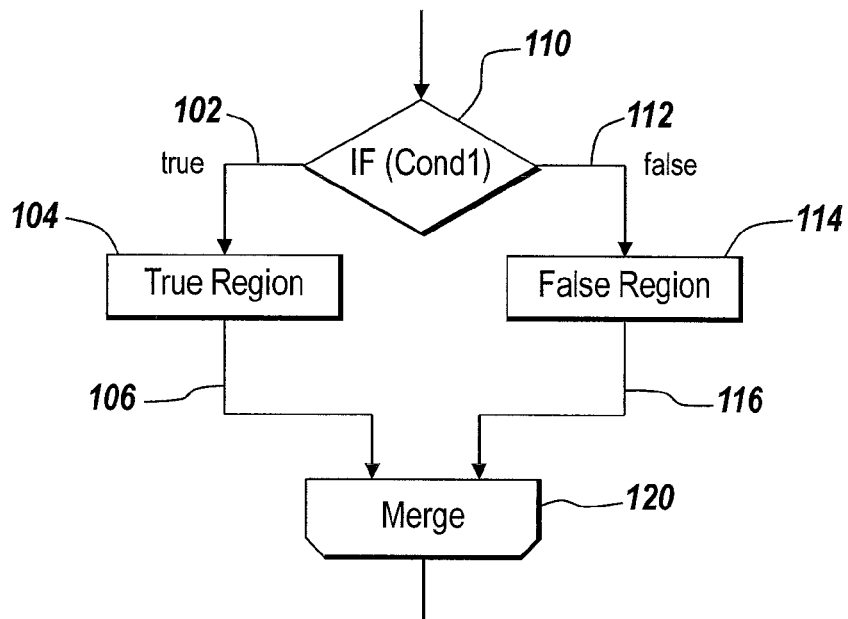
FIGS. 1A-B illustrate two exemplary structured acyclic SESE CFG regions.

Control flow graphs may be cyclic (containing cycles) or acyclic (not containing any cycles), and structured or unstructured. A cyclic graph is one that has at least one edge leading out of one node to a second node, which has already been traversed on the path to the first node. Structured CFGs may typically be represented using IF-ELSE or CASE or similar statements in addition to blocks representing intermediate code sections.

Unstructured CFGs are those, which cannot be decomposed fully into IF-ELSE, WHILE or similar regions. Code generated from such control flow graphs usually contains GOTO statements or functionally similar constructs to properly transfer control from one region to another. As referred to herein, a CFG may be a portion of a larger CFG, and, conversely, a CFG may contain CFG regions, some of which may be structured, and some unstructured. Statements other than GOTO may cause a region to be unstructured; for example BREAK and CONTINUE commands may sometimes contribute to creating unstructured code regions. Other language constructs, referred to herein as "GOTO or similar constructs" may be determined to result in unstructured code, as identified by one of skill in the art.

Unstructured CFGs may come from a variety of places or applications. For example, some graphical programming environments allow users to generate graphical programs without specific control flow restrictions. A CFG representation of a graphical program may therefore contain one or more unstructured regions.

A graphical programming environment is one in which visual expressions, and the interconnections among visual expressions, are used to control program functions. Diagrammatic programming languages may be structured according to a block diagram, where a set of nodes, called blocks, are interconnected by lines that may represent signals. Blocks are computation entities that perform mathematical operations, transformations, or both, on data and information passed through the block diagram. Signals are data connections between various blocks. Signals have particular data types, and may also include timing and control information related to the blocks. Blocks may have sample rate or may execute at a particular rate.

One graphical programming environment is the Simulink® technical computing environment available from The MathWorks, Inc. of Natick, Mass. The Simulink® environment allows a user to create a dynamic system by constructing a block diagram from a plurality of blocks provided in a pre-defined library, or specially defined by a user. Each block produces outputs either continuously (i.e., a continuous block) or at specific points in time (i.e., a discrete block). There may also be hybrid blocks. The signals share the outputs to other blocks to indicate interactions between the blocks.

With the Simulink® environment, a user may model and simulate the behavior of a system in response to certain input and control data. Such a simulation may be performed in the diagrammatic programming environment itself, using an interpretive process. Alternately, a user may convert the block diagram or portions of it to executable code. Automatic code generation is a process where text-based program code (such as C or C++ code) is automatically produced from a diagrammatic representation. The text-based program code may then be compiled to produce an executable file or shared library. In this manner, the functionality specified in the block diagram may be exported beyond the diagrammatic programming environment to computers that lack the ability to interpret block diagrams. In yet another alternative, the block diagram or portions of it may be translated to code specific for an embedded hardware target, such as a digital signal processing (DSP) chip, and this code used with the embedded hardware target to execute the functionality of the block diagram. In this manner, a block diagram may be used in rapid prototyping and testing applications, where hardware devices configured in a particular manner are required. Alternative examples of graphical modeling environments include Stateflow® from The MathWorks, Inc. of Natick, Mass., LabView by National Instruments, Inc., UML or SysML design tools, SCADE by Esterel Technologies, etc.

Textual languages, such as, for example, C, C++, Perl, Python, Java, Javascript, FORTRAN, M (a programming language, at least a subset of which is compatible with a MATLAB® programming environment from The MathWorks, Inc. of Natick, Mass.), etc. may also generate unstructured CFGs. In general, any textual language that has a GOTO or a similar construct for specific control of execution flow may generate an unstructured CFG. Additionally, languages that do not have explicit GOTO-like constructs may generate unstructured CFGs. M is an array-based language, facilitating operations on array-based data types, such as vectors and matrices. Models programmed in M or other MATLAB-compatible languages may have unstructured regions or result in generated unstructured code. A language may be considered to be MATLAB-compatible if a subset of its commands is executable in the MATLAB® modeling environment.

Unstructured CFGs may be problematic or undesired in a number of applications or situations. For example, CFGs are typically used as an intermediate representation in code generation, such as, for example, generating C code from graphical models or diagrams. C code generated from an unstructured CFG contains one or more GOTO commands, but such commands may be in violation of some industry or customer-defined coding standards. For example, compliance with the coding guidelines of the Motor Industry Software Reliability Association (MISRA) requires absence of the GOTO statements.

In an alternative example, a CFG may be used as a code generation intermediate representation (CGIR) in hardware description language (HDL) code generation or design verification. HDL and/or design verification may be considered as backends for CGIR. Current implementations of HDL and/or design verification may not support unstructured CFGs.

In addition, some proof checkers or static analyzers do not handle GOTO-like constructs, or do not support unstructured CFGs. Proof checkers and static analyzers play an important role in code testing and verification, and in many situations it is advantageous to represent software and/or hardware in a form understandable to a proof checker.

Therefore, it may be desirable to convert an unstructured portion of a context free graph into a structured portion, such that the structured portion is functionally equivalent to the unstructured portion. That is, given an unstructured SESE CFG having multiple unstructured regions, it may be possible to convert at least one of its unstructured regions into a structured SESE region.

One embodiment of the invention identifies unstructured regions in a CFG. Another embodiment converts some of the identified unstructured regions into structured regions using appropriately placed guard variables. Yet another embodiment may simplify or restructure a resulting structured CFG.

Figure 1B:
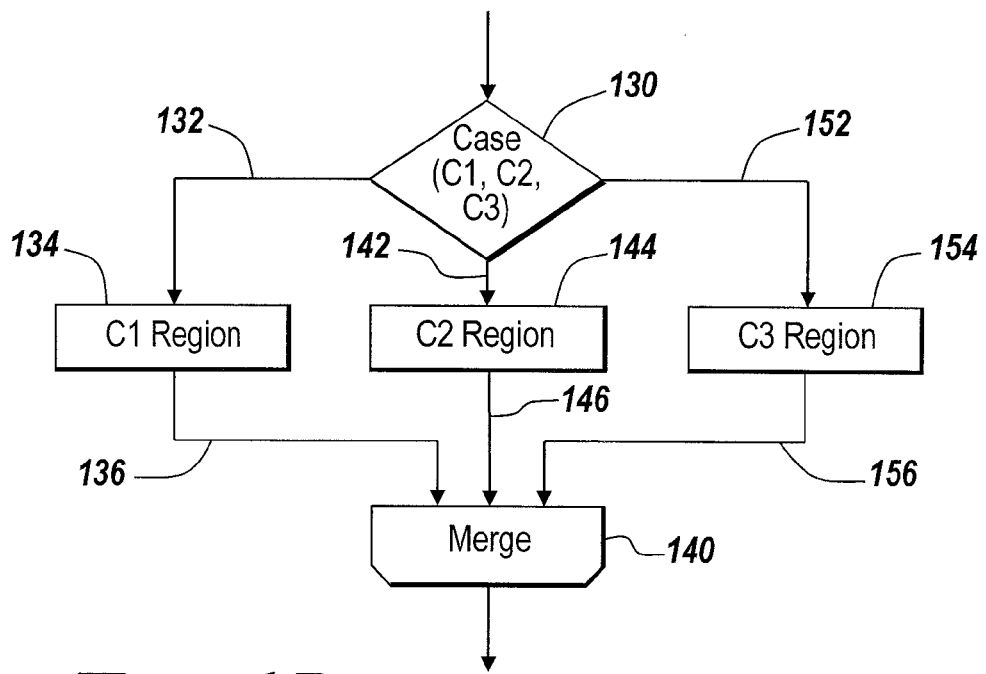

FIGS. 1A and 1B illustrate two examples of structured acyclic SESE CFG regions. FIG. 1A is an illustration of an IF-ELSE CFG region. There is a single entry—node 110 and a single exit—node 120. In between, depending on the value of the conditional expression "Cond1" inside the IF statement, control may flow to trueRegion 104 or falseRegion 114 through edges 102 or 112, respectively, and then may converge at MERGE node 120 through edges 106 and 116, respectively.

In one exemplary embodiment, code generated from the region shown in FIG. 1A may be represented as:

```
If(Cond1) {
TrueRegion;
}
Else {
FalseRegion;
}
```

The words "TrueRegion" and "FalseRegion" are used to represent one or more commands or lines of code. If the generated code were to be executed, those commands or lines of code would be executed when the flow of control reaches them. In some cases, depending on the code contained inside those regions, they may be also represented as CFGs that include regions that can be further decomposed into CFGs and so on.

Similarly, FIG. 1B is an illustration of a CASE region, such as, for example, generated from a "case" or a "switch" statement. Unlike IF node 110 (FIG. 1A), CASE node 130 has three conditions, with flow of control passing to one of regions 134, 144 or 154, depending on satisfaction of one of the conditions. The three paths then merge at MERGE node 140. In one exemplary embodiment, code generated from the CFG of FIG. 1B may be represented as:

```
switch(Cond1) {
  case c1:
    C1Region;
    Break;
  case c2:
    C2Region;
    Break;
  case c3:
    C3Region;
    Break;
  default: break;
}
```

Alternatively, the flow of control shown in FIG. 1B may be functionally mirrored using IF/ELSE statements. For example, the flow of control of FIG. 1B can be represented as:

```
if(Cond1=c1) {
  C1Region;
}
else {
  if(Cond1=c2) {
    C2Region;
  }
  else {
    C3Region;
  }
}
```

As can be seen from the above examples, one CFG may represent different syntactic textual and/or graphical modules. Conversely, some CFGs different in appearance may, in fact, represent functionally equivalent modules. It also should be noted that code shown above need not have been generated from the CFGs shown in FIGS. 1A and 1B; it may have been that the CFGs have actually been generated from the code shown.

The CFGs illustrated in FIGS. 1A and 1B are structured CFGs, because code generated from them does not contain GOTO or similar statements. That is, there is no point, where flow of control jumps over the commands that would have been executed if not for the explicit instruction to go to a different command or execution point.

Figure 2A:
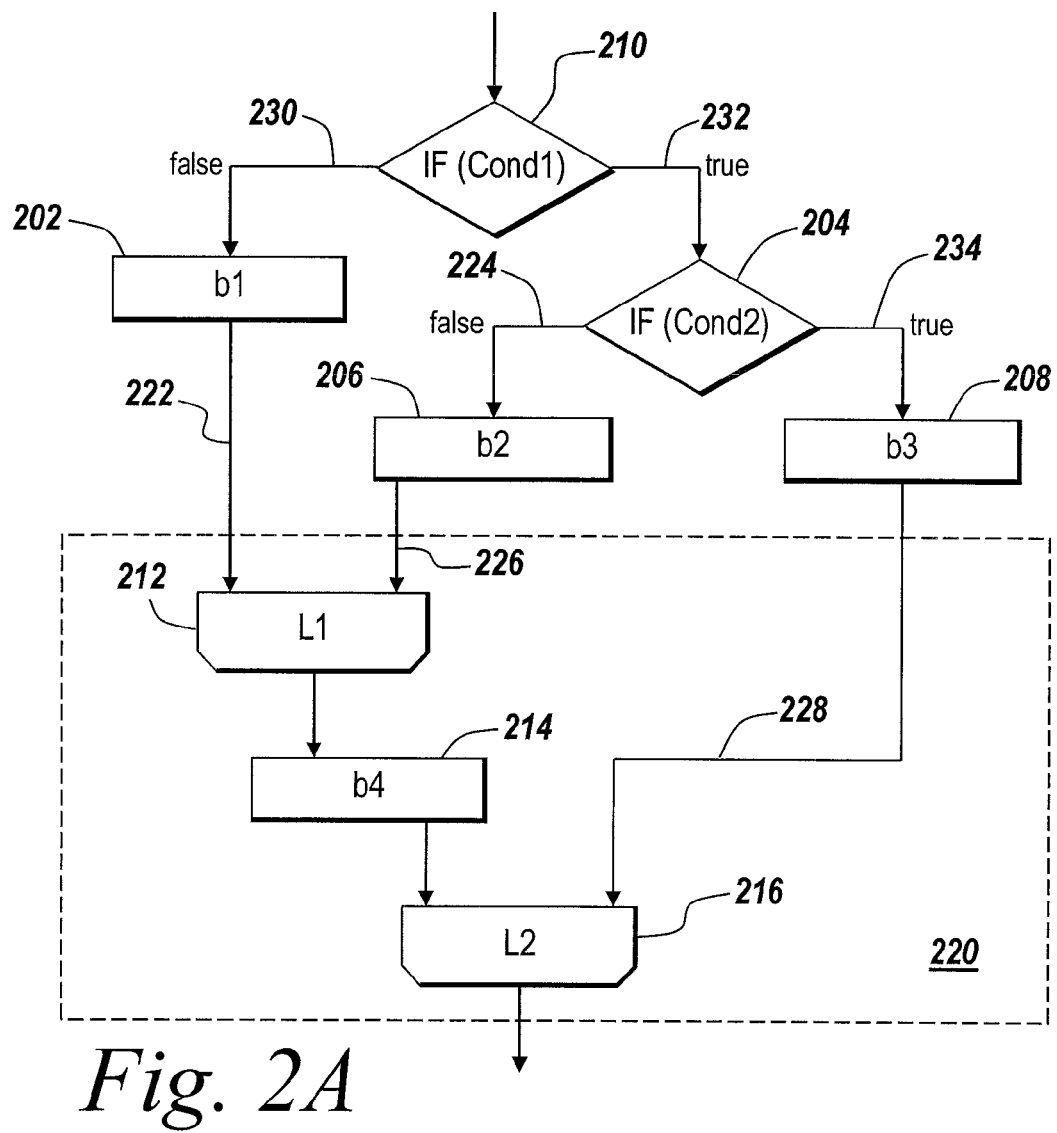
FIGS. 2A-B illustrate an exemplary unstructured acyclic SESE CFG region and possible corresponding code.
Figure 2B:
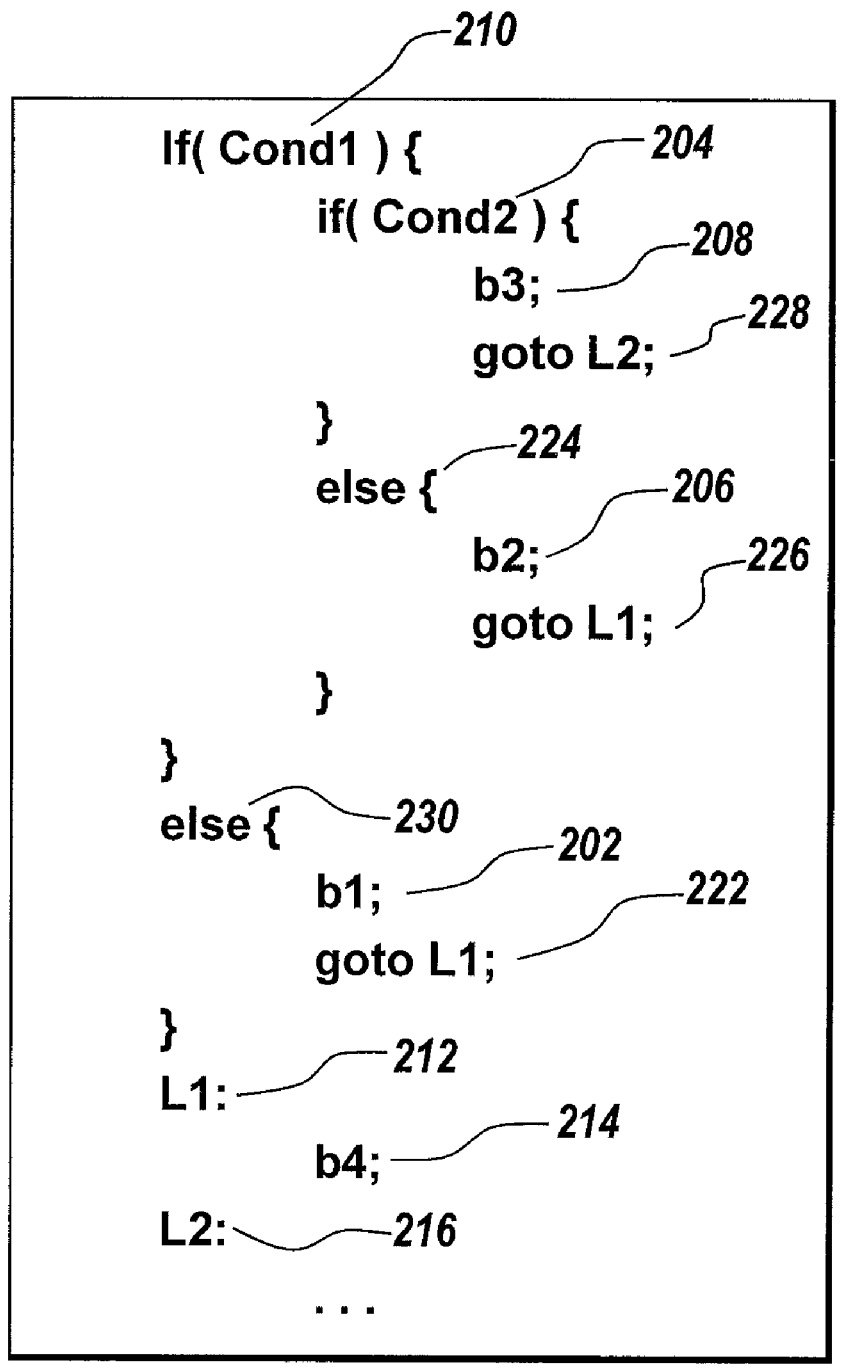

FIGS. 2A-B illustrate an example of an unstructured acyclic SESE CFG region and possible corresponding code. FIG. 2A is an illustration of an example of an unstructured CFG. It has an entry node—IF node 210, from which execution may proceed to b1 node 202 through path 230 or to another IF node (204), resulting in two additional possible execution paths, leading to blocks b2 206 and b3 208.

Execution paths from nodes 202 and 206 merge at MERGE node L1 212, after which block b4 214 should be executed. All possible execution paths merge at MERGE node L2 216, which acts as the single exit node for this portion of the context free graph.

FIG. 2B illustrates exemplary C code corresponding to the CFG of FIG. 2A. Command lines in FIG. 2B are labeled with the same numbers as corresponding nodes and edges in FIG. 2A. In addition to IF/ELSE commands, control over execution flow is also achieved with GOTO statements (lines 228, 226, 222). While line 222 can possibly be omitted, because region L1 (212) follows directly after it, lines 228 and 226 are necessary to move the execution to a desired or proper region.

Shown on FIG. 2A, is unstructured region 220, which may correspond to the GOTO-like flow of execution of FIG. 2B. Region 220 is characterized by having a block of code (214) between two different MERGE nodes (212 and 216). In one embodiment of the invention, every section of the CFG, which contains multiple MERGE nodes, which cannot be absorbed into smaller SESE regions or collapsed into existing MERGE nodes, is considered an unstructured region. For example, region 220 may be designated as unstructured because it contains two MERGE nodes (212 and 216) with at least one path (formed by edges 232, 234, and 228) leading to the second MERGE node, which does not go through the first MERGE node and so may not be absorbed into a smaller SESE region. In an alternative embodiment of the invention, additional qualifications may be used to identify an unstructured region.

As discussed above, block b4 214 may represent any SESE region, including the one containing IF/ELSE nodes or other split nodes and MERGE nodes. It may be convenient to perform restructuring at a particular level of abstraction first and then proceed to perform a similar kind of restructuring inside the SESE region identified by block b4. In an alternative embodiment of the invention, identifying unstructured regions and/or restructuring may be done "bottom-up," that is, on the smallest level first and then on a higher level. In yet another embodiment of the invention, a module performing the identification or restructuring may change levels or work on more than one level at a time, as deemed appropriate by one of skill in the art.

In one embodiment of the invention, unstructured regions may be identified prior or separately from restructuring (if any). Such identification may be useful, for example, for purposes of indicating which regions do not confirm with code standards or would not be available for conversion to HDL or other languages lacking GOTO-like constructs.

Such identification may proceed, for example, by locating all MERGE nodes by following edges from an entry node. The edges may be followed in a depth-first or breadth-first or another type of search such as, for example, A*. Pairs of MERGE nodes may then be examined to determine whether they are part of an unstructured region, as described above.

In an alternative embodiment of the invention, identification of the unstructured regions may be performed in the same pass over a context free graph, as the restructuring of those regions. It may be possible to eliminate unstructured regions by code duplication—that is, by copying the section of code to which a GOTO instruction might lead directly to the place where such an instruction would occur. For example, in FIG. 2B, section of code b4 (214) under label L1 (212) may be copied to lines 226 and 222, and section of code following label L2 (216) may be copied to line 228.

Restructuring of unstructured regions through code duplication is appropriate in some applications and may be used with the above described process of identifying unstructured regions. However, there are some situations in which code duplication is undesirable because it creates additional lines of code. Such additional lines of code may be viewed unfavorably in case of HDL generation, because HDL represents a hardware design, and extra lines of code add to the overall size of the designed hardware, whereas smaller hardware footprint is often one of the goals of hardware design.

Another class of applications where code duplication may not be appropriate includes situations where CFG is cyclical—that is, it contains one or more cycles (loops), with some edges leading to a node already traversed on the path leading to the originating node of that edge. Cycles may be common in code or CFGs generated from textual code or from some graphical diagrams. Restructuring regions through code duplication may not work within a cycle, because execution of the duplicated code may not be appropriate on every path through the loop.

In one embodiment, rewriting of the unstructured SESE CFG regions into functionally equivalent SESE CFG regions is accomplished by using guard variables. A "guard variable" is a variable introduced into a CFG or corresponding code and is used near the regions where a GOTO-like construct would be appropriate or the code regions where a GOTO might lead. A guard variable is set to a particular value before or instead of the GOTO construct. That variable is later tested before execution of the code section to which GOTO may have led. Testing may be performed inside an IF statement or any other test statement. The code is executed if the guard variable is found to have the value set in place of the GOTO command. Otherwise, the flow of execution proceeds further without executing the commands inside the IF statement. In such a way, the code that originally would have to have been under a label is "guarded" using one or more guard variables. In an alternative embodiment of the invention, in languages not requiring variable declarations, the existence or non-existence of the guard variable may itself be used as a test guarding a piece of executable code.

In some embodiments of the invention, guard variables may be introduced directly into a CFG, into a path leading to one of the MERGE nodes, allowing for the code between the two MERGE nodes to be moved below the latest one of them, provided that it is guarded by an IF/ELSE node.

Figure 3:
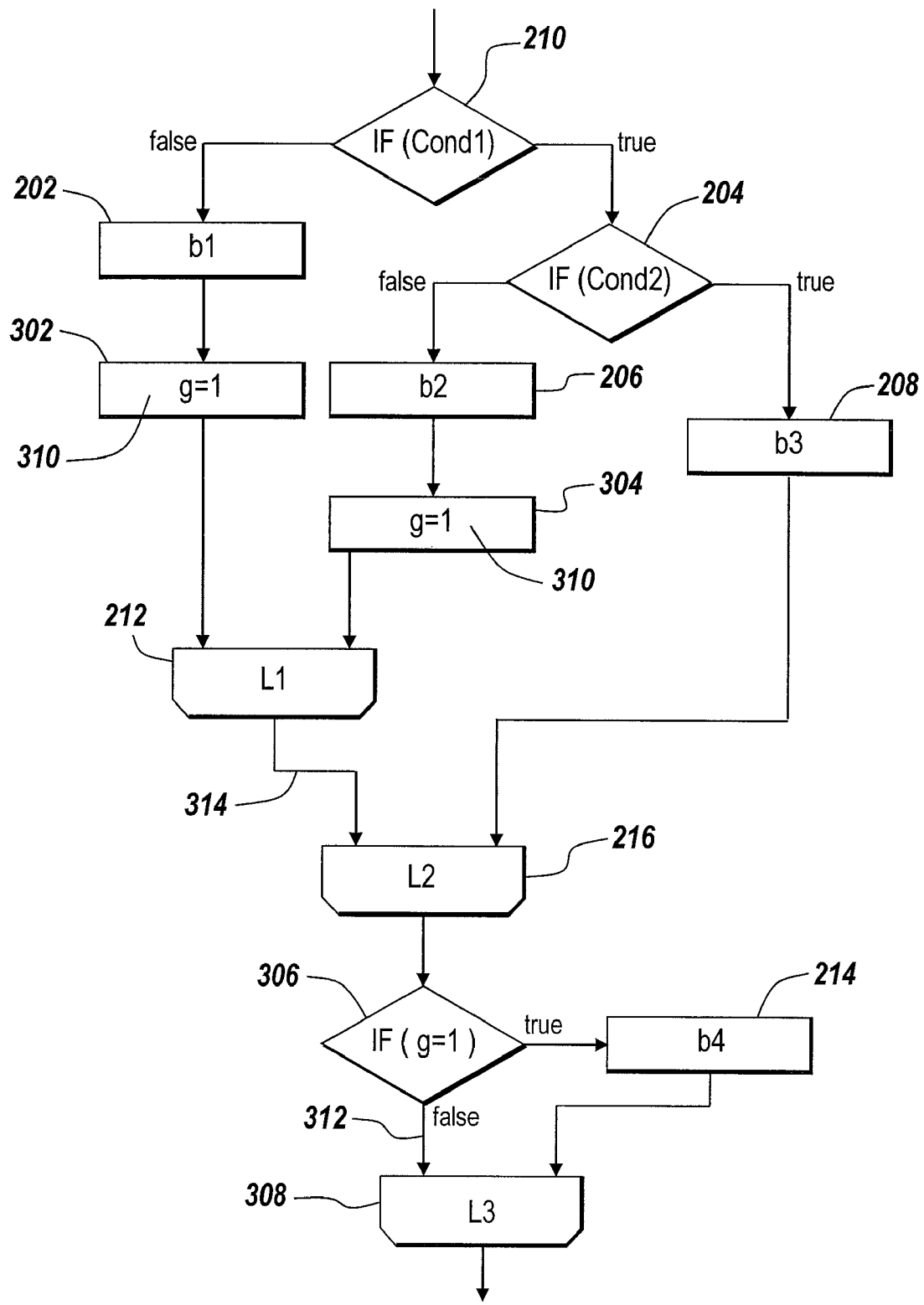
FIG. 3 is a schematic illustration of one of possible restructuring of the CFG of FIG. 2A.

FIG. 3 illustrates such restructuring of the CFG of FIG. 2A. A guard variable "g" (310) has been introduced to the CFG. It is set to be equal to "1" on all paths that originally would have led to the execution of block b4 214. The block itself has been moved below MERGE node L2 216. IF node 306 is introduced before block b4 214, checking for the value of guard variable "g" 310, so that block b4 214 is executed only if "g" is equal to "1." As can be seen, this CFG is functionally equivalent to that of FIG. 2A, because block b4 214 will get executed only under the same conditions as in FIG. 2A. However, this resulting CFG does not contain any unstructured regions, and there are no code blocks located on path 314 between MERGE nodes 212 and 216.

Once the region has been restructured and code is appropriately guarded, one embodiment may proceed with further reformatting the graph, while an alternative embodiment may keep the graph as is. The reformatting may include, for example, reorganization, merging multiple MERGE nodes into one or splitting one MERGE node into two or more MERGE nodes.

Figure 4A:
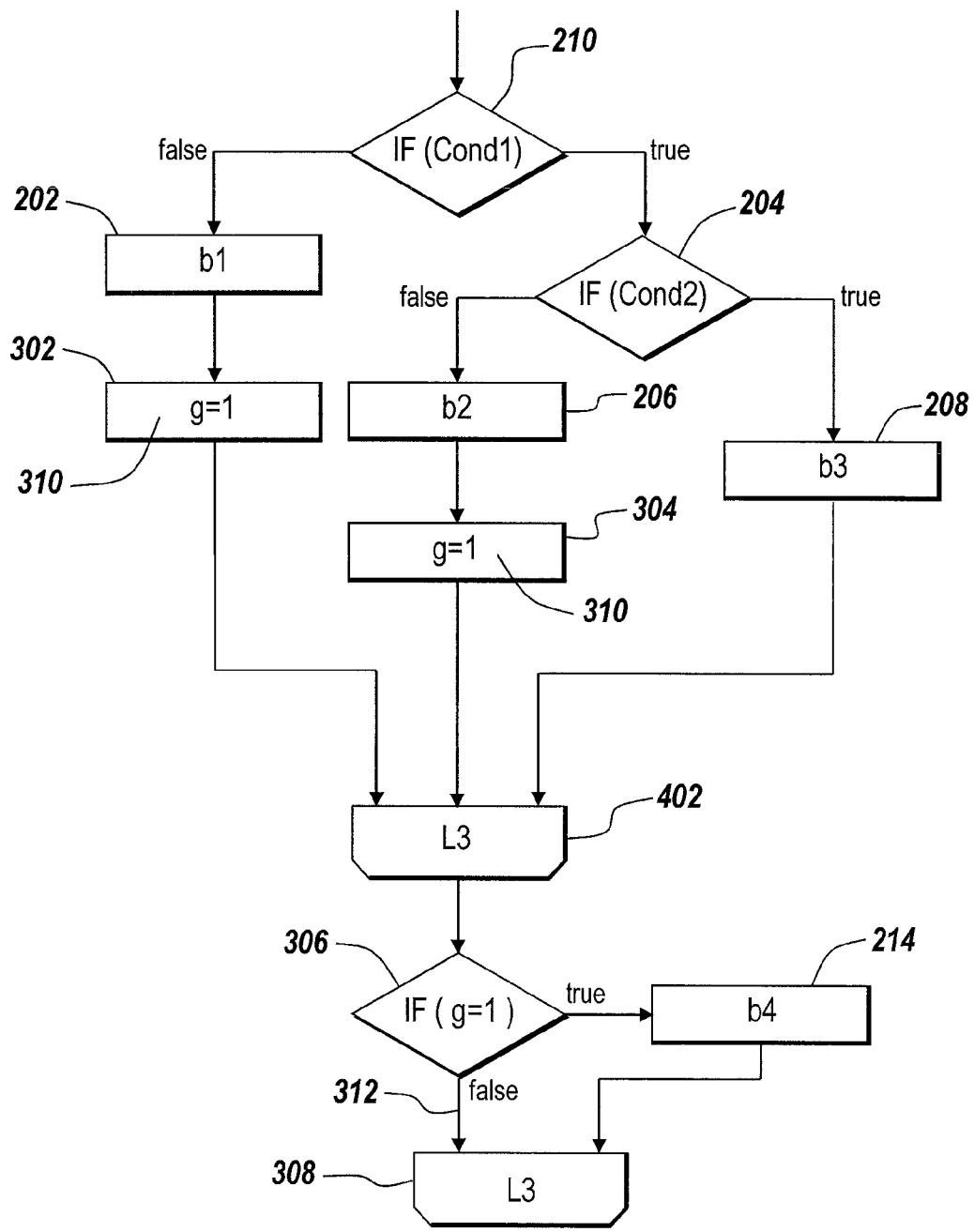
FIGS. 4A-C are a schematic illustration of one of multiple possible reorganizations of the CFG of FIG. 3.
Figure 4B:
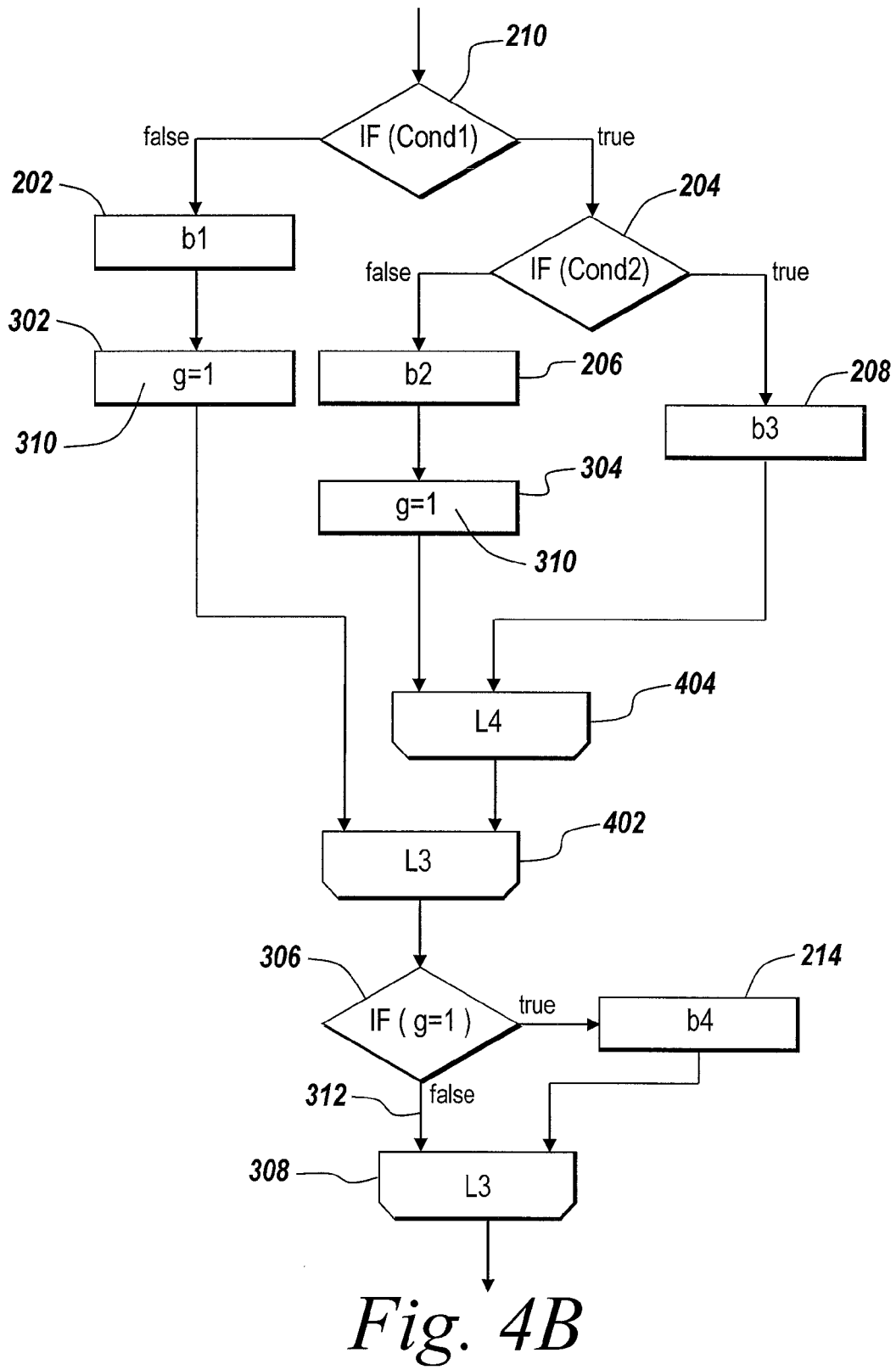
Figure 4C:
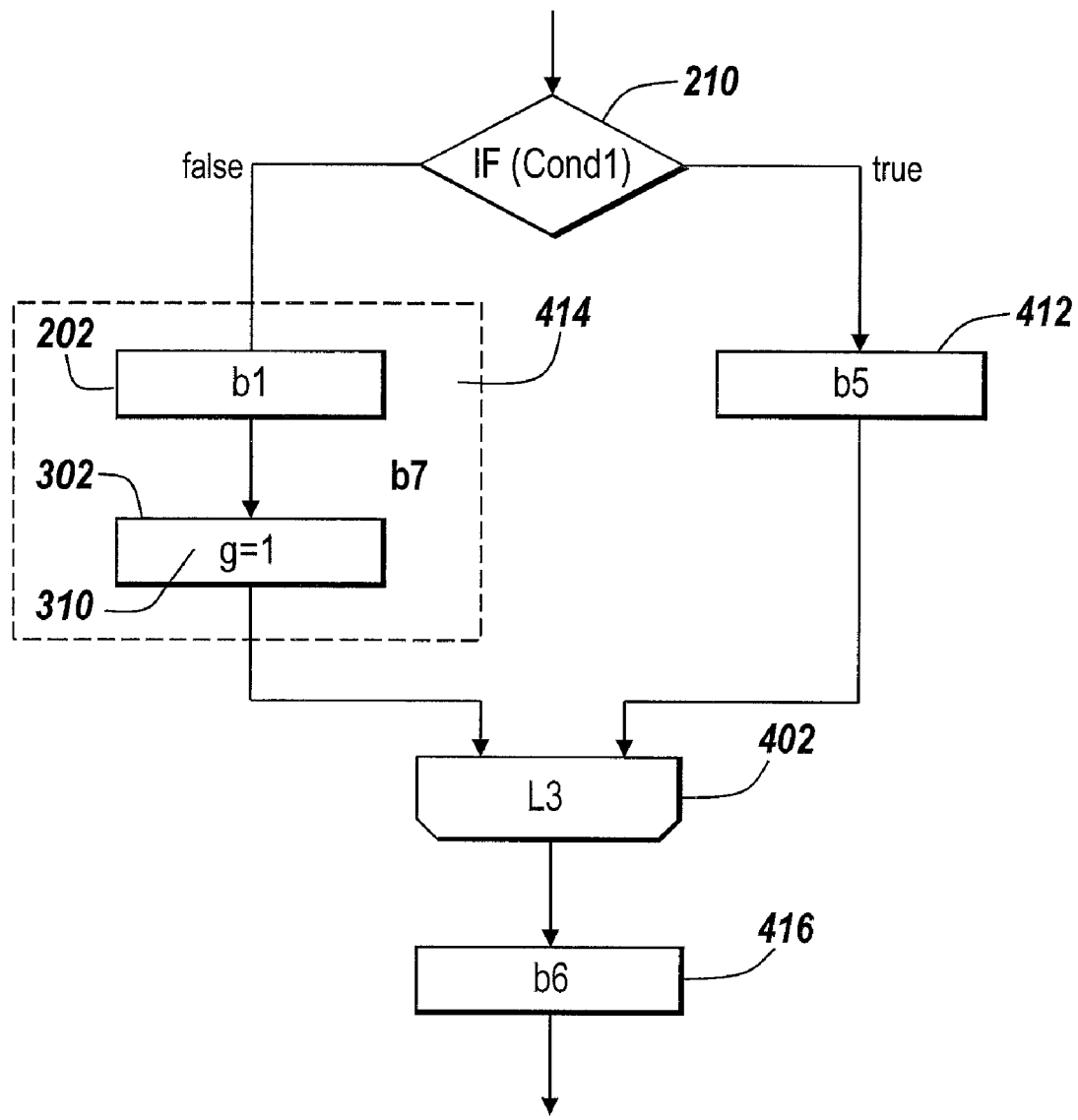

FIGS. 4A-C illustrate one of multiple possible reorganizations of the CFG of FIG. 3. In FIG. 4A, MERGE nodes 212 and 216 have been combined into one MERGE node 402. In one embodiment of the invention, MERGE node 402 may then be split up into two nodes using, for example, principles of optimal merge splitting used in compilation and/or CFG analysis. In an alternative embodiment of the invention, the MERGE nodes may be split using some other principle or left with multiple inputs.

Illustrated in FIG. 4B is one possible split of MERGE node 402, into two MERGE nodes L4 404 and L5 406. In FIG. 4C, the region corresponding to TRUE test of Cond1 has been rewritten as a single SESE block b5 412. Blocks 202 and 302 may also be combined into a single SESE region b7 414. Likewise, another portion of the graph, which may be testing of the guard variable and/or executing block b4 214 can be viewed as another structured SESE region 416. It can be seen that the remaining CFG is now a structured non-trivial SESE region—that is, a structured SESE region that contains at least one SPLIT and at least one MERGE node. Code generated from this restructured CFG may now contain only IF/WHILE statements and no GOTO or similar flow of control modifying statements, and so it may be appropriate for HDL generation, standards compliance, or any other application, as deemed appropriate by one of skill in the art.

In one embodiment of the invention, identifying unstructured regions, restructuring them and then further reorganizing a CFG may be performed by one process. In alternative embodiments of the invention, these steps may be split up between different processes, be implemented differently than described herein or one or more of them may be omitted entirely.

Figure 5:
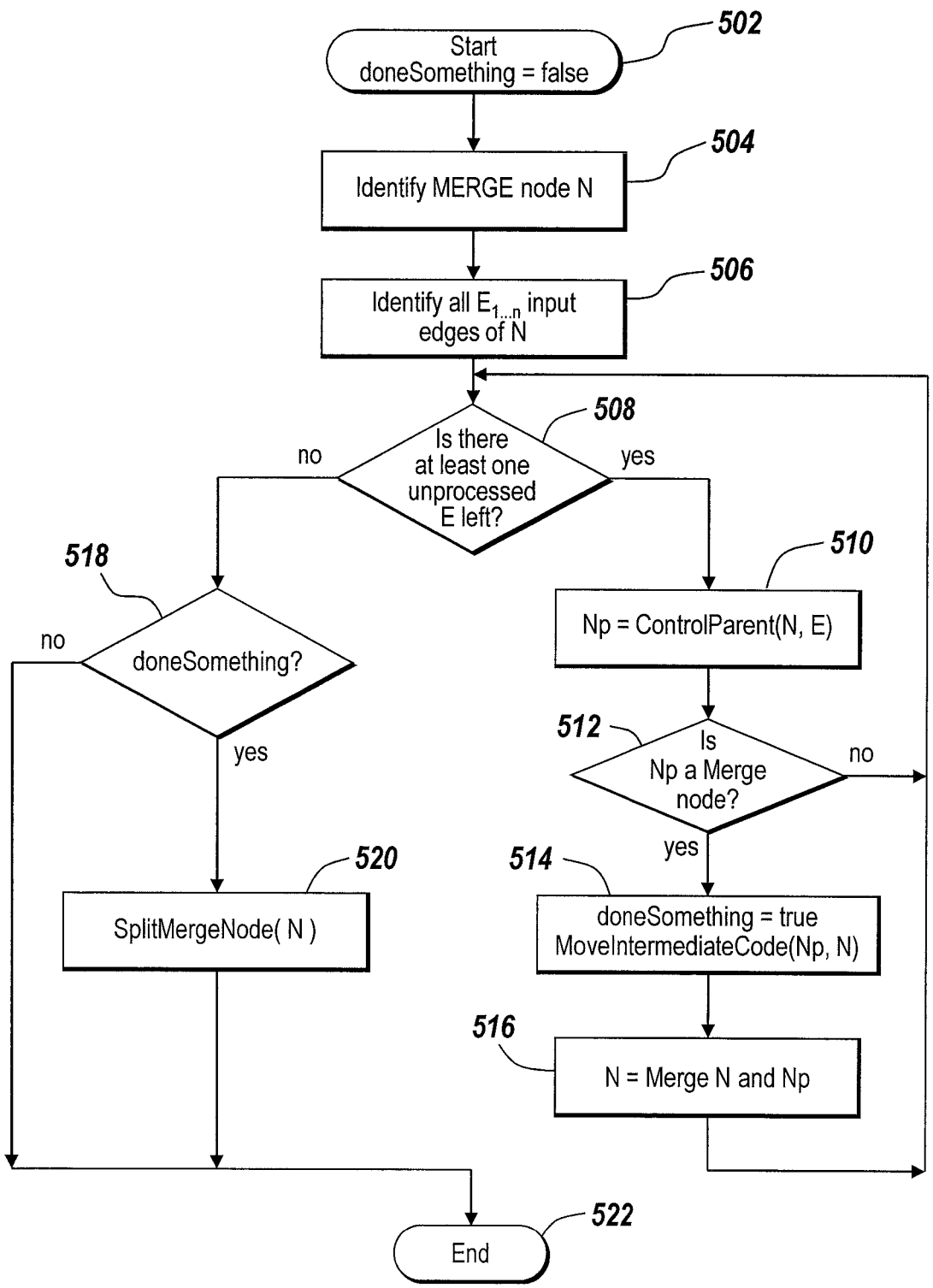
FIG. 5 is a flow chart illustrating CFG restructuring process according to one embodiment of the invention.

FIG. 5 is a flow chart illustrating CFG restructuring process according to another embodiment of the invention. In one embodiment of the invention, the process described herein in connection with FIGS. 5-8 may be used on any unstructured CFG, whether cyclic or acyclic. In an alternative embodiment of the invention, the process may be restricted to acyclic graphs. In yet another embodiment of the invention, additional restrictions may be imposed on a processed graph, while in alternative embodiments graphs may not have some of the features as graphs shown in illustrations herein. For example, while some embodiments of the invention are shown as having no multiple-input multiple-output nodes in a CFG, alternative embodiments of inventions may process multiple-input multiple-output nodes graphs as well. Yet other embodiments may process graphs with multiple-input single-output or single-input multiple-output nodes or may convert such graphs to a format similar to that of the graphs shown herein.

Referring to FIG. 5, CFG restructuring starts with identifying at least one MERGE node N (504), after which all of its edges are located (506). Edges E under consideration here are the ones leading to N, not the ones leading out of it. These edges may already be stored in a data structure, or may be identified through a graph search.

For each of the input edges E to node N (508), function ControlParent(N, E) is called and its result is assigned to a variable $N_p$. Function ControlParent(N, E) traverses the edge upwards to locate and return the next MERGE or SPLIT node. Function ControlParent(N, E) is further described below in connection with FIG. 6.

If identified node $N_p$ is a MERGE node (512), a flag is set, indicating that at least a portion of the graph has been restructured, and the code between two MERGE nodes is guarded and moved below the second MERGE node by a call to function MoveIntermediateCode($N_p$, N). MoveIntermediate- Code($N_p$, N) sets a guard variable before the entry of the higher of the two MERGE nodes under consideration and pulls the code from between two MERGE nodes to below the lower one of them, properly guarding it by checking the guard variable. The guard variable may be initialized to a value different from the guard value before the entry to the unstructured region. It should be noted that the terms "higher," "above," "below," etc., are used herein in the sense of indicating relative position in the graph, regardless of how a graph is schematically drawn (or regardless of it being expressed textually). "Higher node" refers to a node whose exiting edges lead to a "lower node," where the lower node is located underneath, or downstream, from the higher node. After the code is moved, nodes N and $N_p$ may be merged (516) and the processing continues on other edges (508).

After all the edges have been processed, it may be useful to check whether any restructuring has been performed (518) and, if so, to rearrange the graph through splitting or merging nodes, which may be accomplished, for example, by a call to function SplitMergeNode(N) (520, see FIG. 8), after which the processing may be complete (522), or, alternatively, it may proceed to on other merge nodes. Each time the graph is reorganized by compacting the bottom-most MERGE node with the upstream nodes between the bottom-most MERGE node and the entry node, the region decreases by a finite amount. Eventually, processing may terminate when the bottom MERGE node is connected directly to the entry node via SESE regions. In alternative embodiments, it may not be possible to achieve such complete restructuring and processing may terminate when sufficient restructuring has been performed or when a predetermined number of regions have been moved, or on a time basis, or based on other limitations, as deemed appropriate by one of skill in the art. A user may determine what constitutes sufficient restructuring.

In one exemplary embodiment, CFG restructuring may be expressed in pseudo-code:

```
ConvertToStructuredRegion(Node N)
Require: N has to be a merge node
1: while 1 do
2:   doneSomething←False
3:   for all E←Input Edge of N do
4:     Node Np←ControlParent(N, E)
5:     if Np is a merge node then
6:       doneSomething←True
7:       MoveIntermediateCode(Np, N)
8:       N←Merge N and Np
9:     end if
10:  end for
11:  if doneSomething then
12:    SplitMergeNode(N)
13:  else
14:    break from loop
15:  end if
16: end while
```

The execution of the restructuring process is not limited to following steps outlined above, and may be performed using any number of different techniques, as will be apparent to one of skill in the art. Actions need not be performed in the same order as described and may be substituted by functionally equivalent or similar actions.

Figure 6:
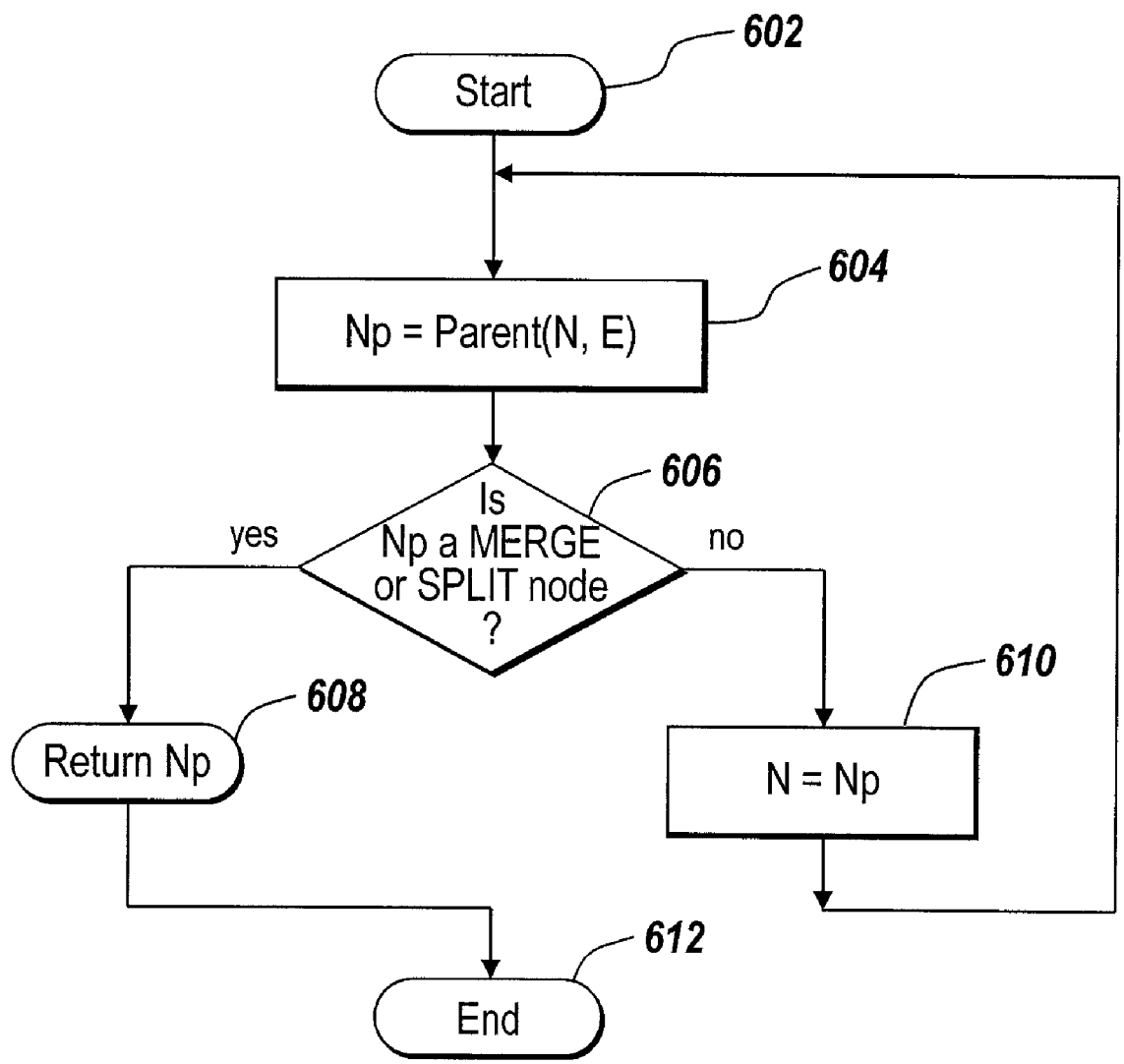
FIG. 6 is a flowchart illustrating processing of function ControlParent(node N, edge E).

FIG. 6 is a flow chart illustrating processing of function ControlParent(node N, edge E). This function, after its start (602), traverses edge E upwards through all nodes (604), skipping all intervening SESE regions (606 and 610), until it arrives at a MERGE or a SPLIT node (606 and 610). The return value is the node Np found (608).

Figure 7:
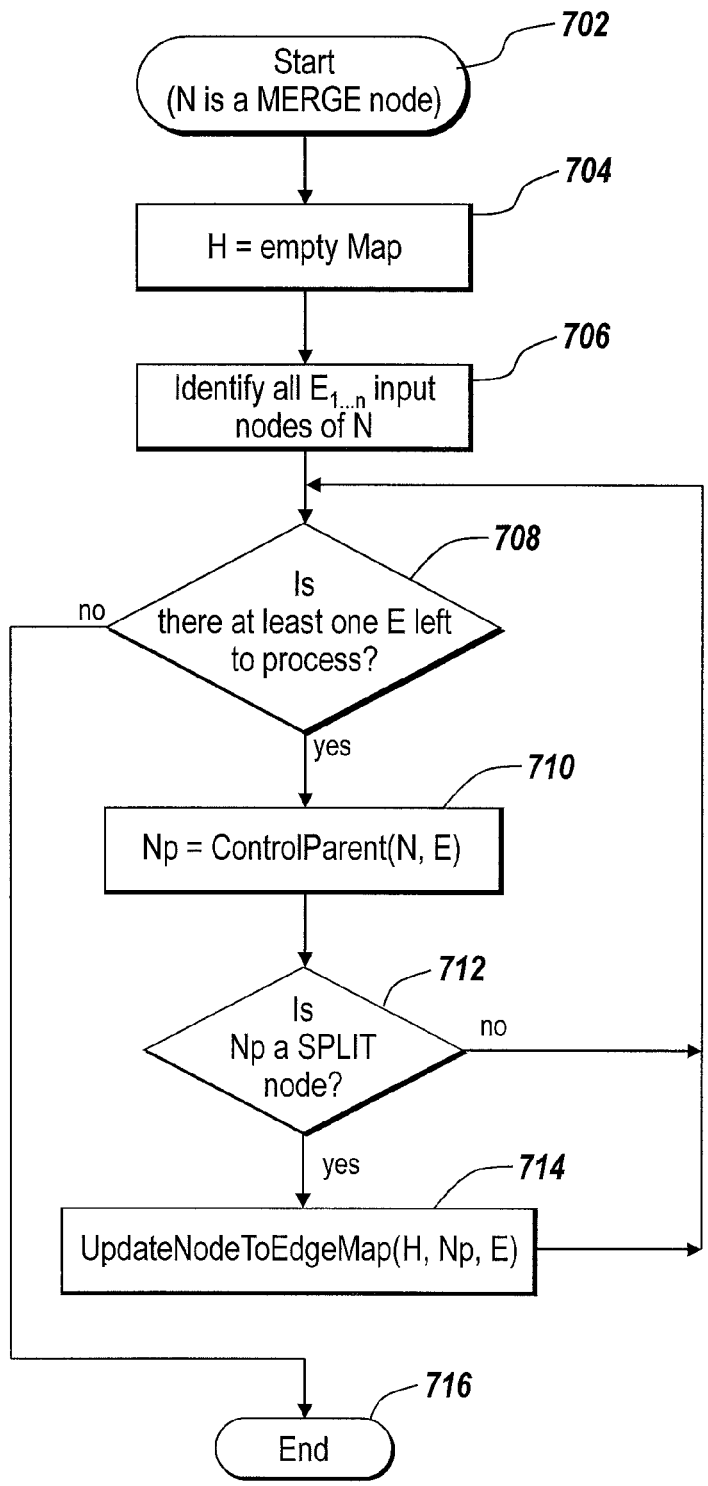
FIG. 7 is a flow chart illustrating processing of function SplitMergeNode(node N).

FIG. 7 is a flow chart illustrating processing of function SplitMergeNode(node N). SplitMergeNode "splits" a given MERGE node N (702) into multiple MERGE nodes such that the number of final input edges reaching the bottom-most MERGE node is minimized. In other words, it maximizes the number of SESE regions formed from edges coming into the bottom MERGE node. Splitting may be performed by various approaches, not necessarily using the one described herein.

At the beginning of processing, variable H is set to be an empty map (704), after which all input edges E to MERGE node N are identified (706). Processing proceeds on each of the identified edges E (708), by calling ControlParent(N, E) (710) and checking whether resulting Np is a SPLIT node (712). If it is, the graph is updated in a call to UpdateNodeToEdgeMap(H, Np, E) (714), otherwise the processing proceeds to the next input edge (708), until all edges have been considered (716). Functionality of SplitMergeNode(N) may be alternatively described with the following pseudo-code:

```
SplitMergeNode(Node N)
Require: N has to be a merge node
1: H←empty map
2: for all Input edge E incident on N do
3:   Np←ControlParent(N, E)
4:   if Np is a split node then
5:     UpdateNodeToEdgeMap(H, Np, E)
6:   end if
7: end for
```

Figure 8:
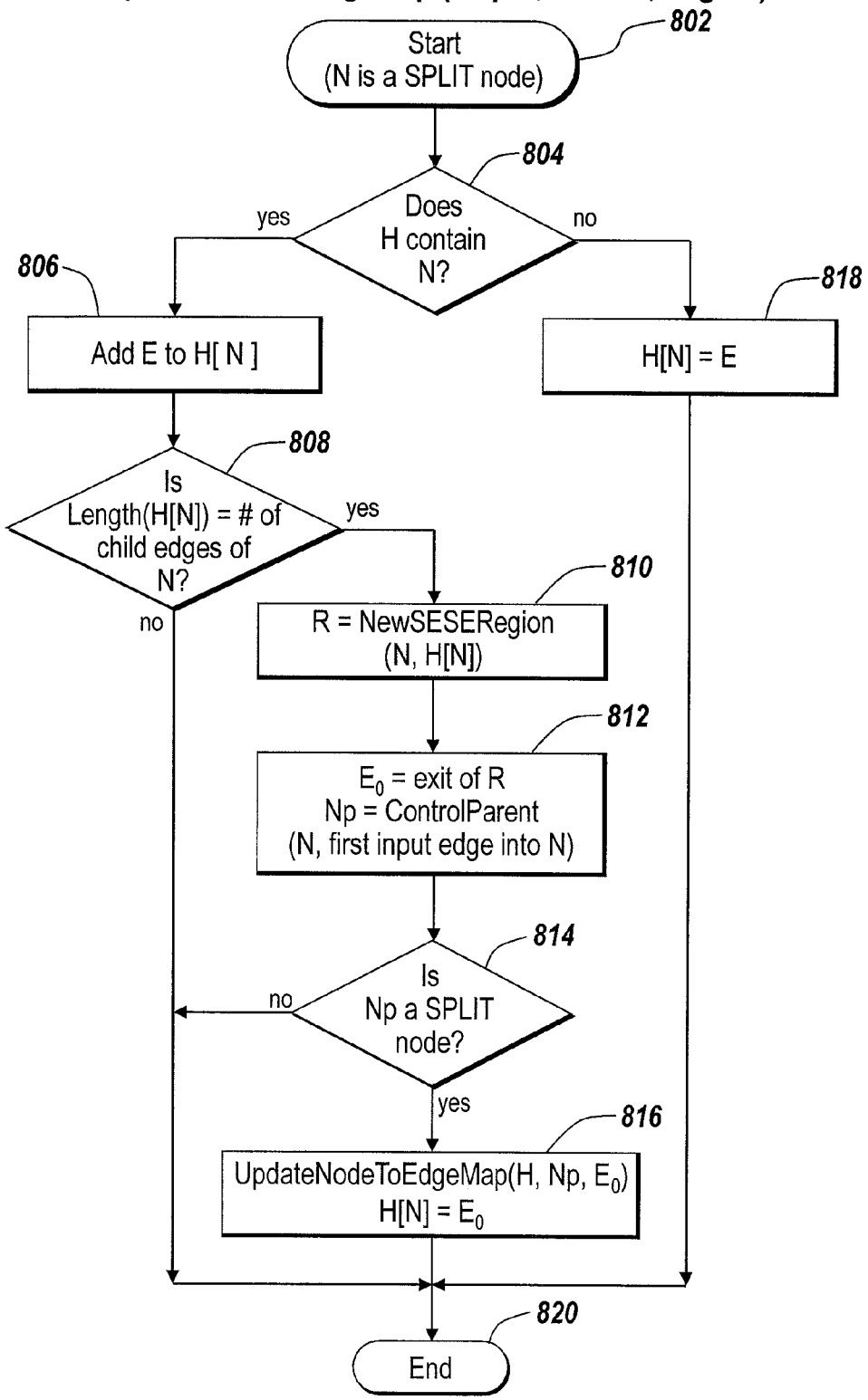
FIG. 8 is a flow chart illustrating function UpdateNodeToEdgeMap(map H, node N, edge E).

FIG. 8 is a flow chart illustrating function UpdateNodeToEdgeMap (map H, node N, edge E). This function assumes (or checks) that N is a SPLIT node (802). If map H already contains N (804), edge E is added to H[N]—map H of N (806), otherwise H[N] is replaced with E (818). After adding E to H[N], the process checks whether the length of H[N] is equal to the number of child edges of N (808), and, if it is, region R is set to be a new SESE region by calling function NewSESERegion(N, H[N]).

When the new SESE region is formed, Eo is set to be its exit edge and Np is set to be the result of ControlParent(N, First input edge into N) (812). If Np is a SPLIT node (814), the function UpdateNodeToEdgeMap is called recursively and H[N] is set to Eo (816). The function UpdateNodeToEdgeMap essentially takes in a node and a list of its child edges and forms a SESE region by merging the edges together into a single merge node. Functionality of UpdateNodeToEdgeMap may be alternatively described with the following pseudo-code:

```
UpdateNodeToEdgeMap(Map H, Node N, Edge E)
Require: Map H mapping split node N to list of child edges Ei of N
Require: N has to be a split node
1: if H contains key N then
2:   Add E to H[N]
3:   if Length(H[N])=Number of child edges of N then
4:     R←NewSeseRegion(N, H[N])
5:     Eo←exit of R
6:     Np←ControlParent(N, First input edge into N)
7:     if Np is a split node then
8:       UpdateNodeToEdgeMap(H, Np, Eo)
9:     Replace edges H[N] going into N with single edge Eo
10:    end if
11:  end if
12: else
13:   H[N]←E
14: end if
```

Figure 9A:
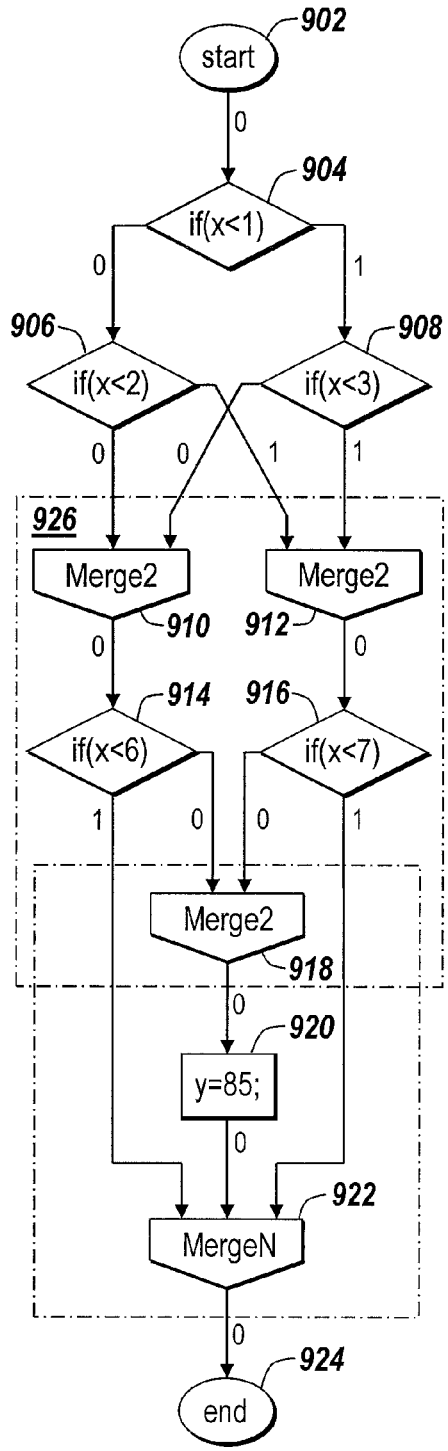
Figure 9B:
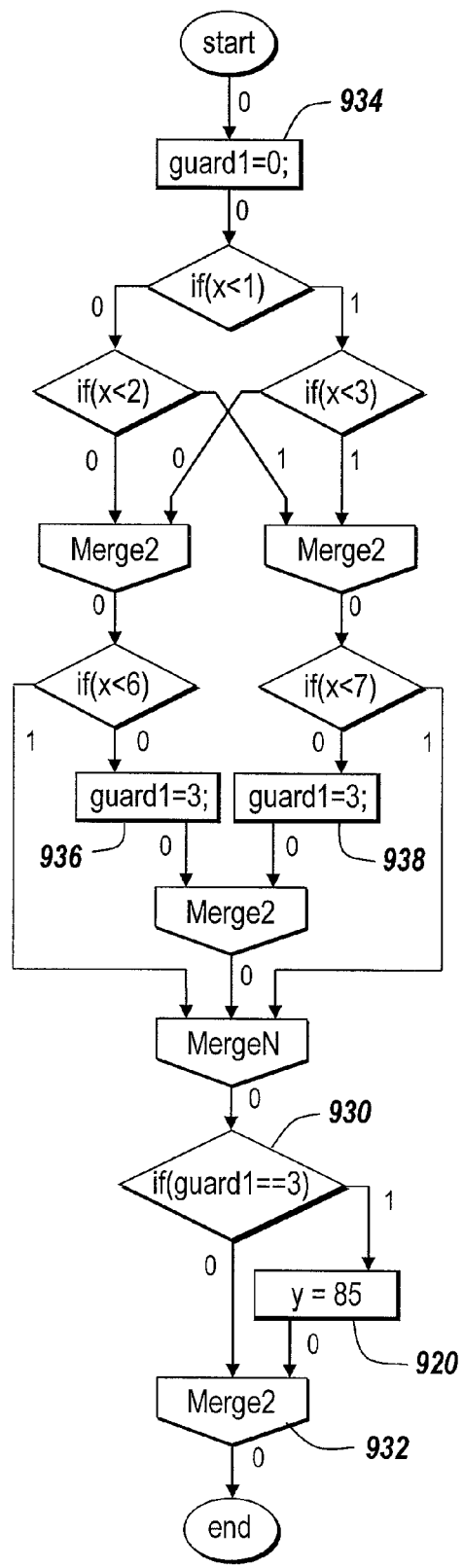

Operation of the above-described functions of one embodiment of the invention may be further illustrated in connection with FIGS. 9A-D and 10A-C. Shown in FIG. 9A is a context free graph with multiple unstructured regions (926, 928). In FIG. 9A, notation MergeN is used to indicate a MERGE node having more than two inputs and Merge2 is used to indicate a MERGE node with two inputs. "0" or "1" next to an arrow indicate whether that edge is taken when the result of a condition is true ("1") or false ("0").

In one embodiment, processing starts from the first MERGE node from the bottom—that is, node 922 in this case. Following the flowcharts shown above, next MERGE node is located (918) and the region including them may be determined to be unstructured, because there is a code block (920) in between the two MERGE nodes.

Code block 920 may then be guarded with a guard variable "guard1," initialized to zero at the entry to the CFG (934, see FIG. 9B) and set on two paths to node Merge2 918 (936 and 938). The check of the guard variable is introduced below node MergeN 922 (nodes 930, 920 and 932).

FIG. 9C illustrates merging of two MERGE nodes, without a code block in between. A new MERGE node—node 940 is formed. That node is then decomposed two using optimal merge splitting (see FIG. 9D, nodes 942, 944 and 946). Region 928 has now been rewritten into a structured region.

Figure 10A:
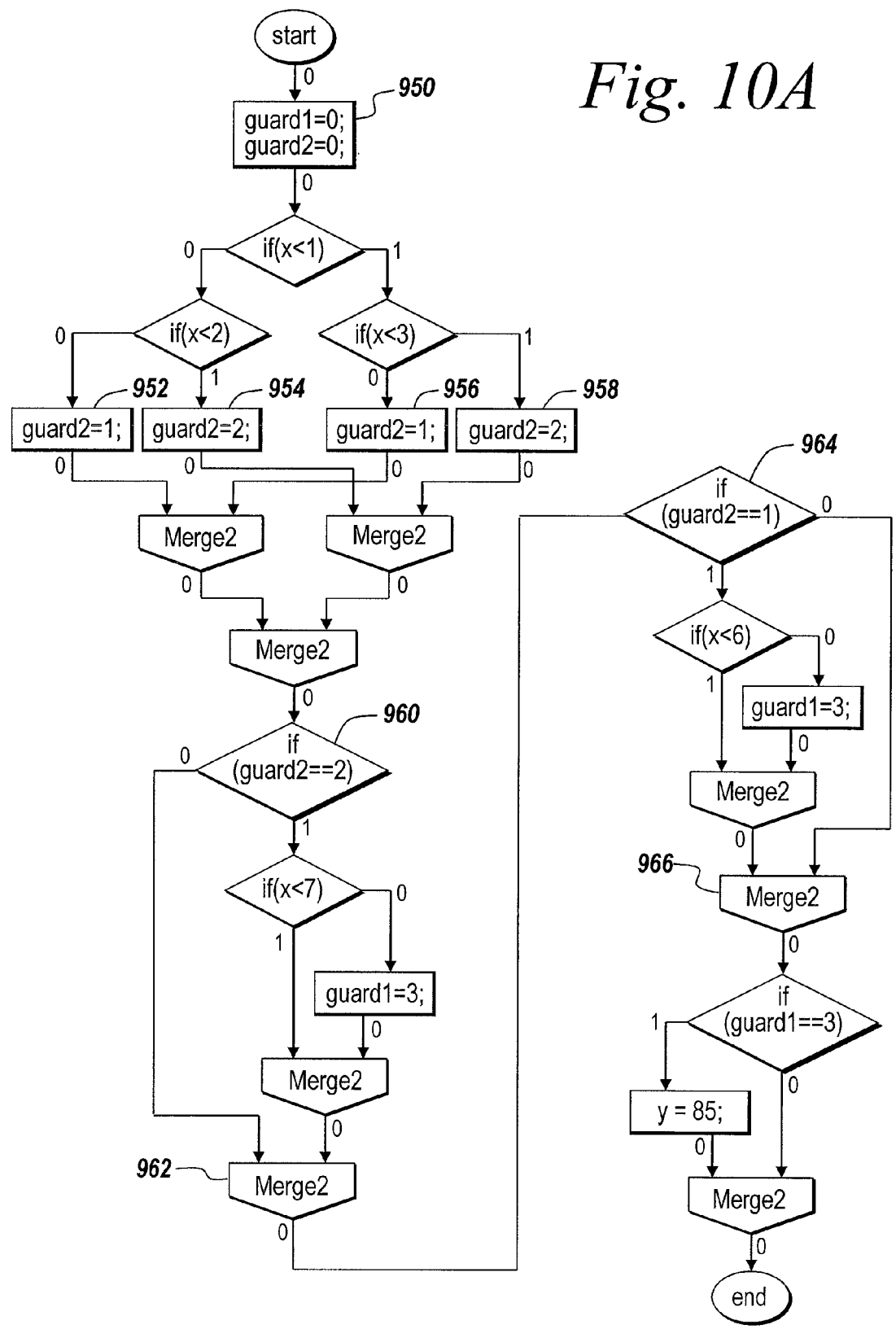
FIGS. 10A-C are schematic illustrations of additional possible reorganizations of the CFG of FIGS. 9A-D.
Figure 10B:
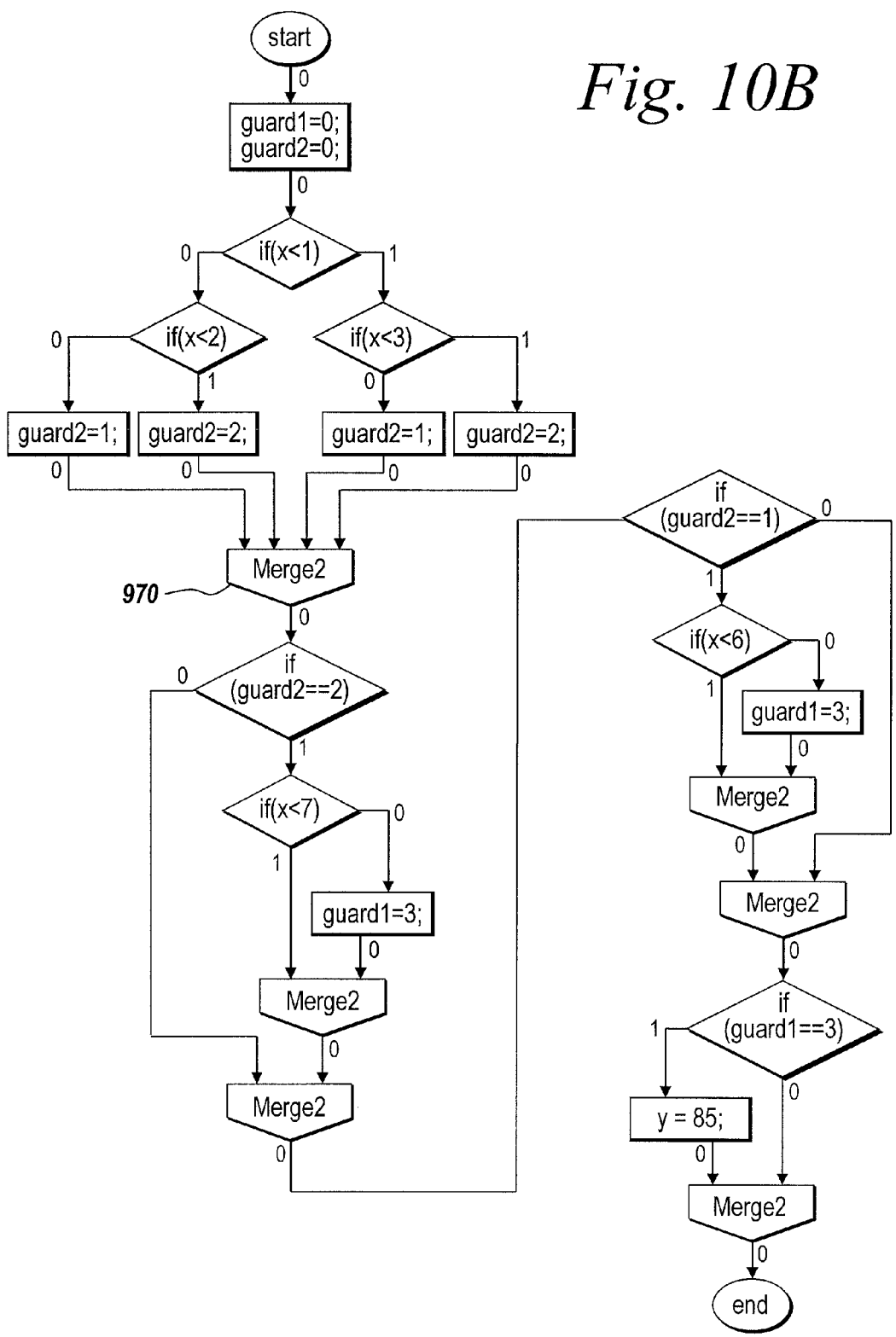
Figure 10C:
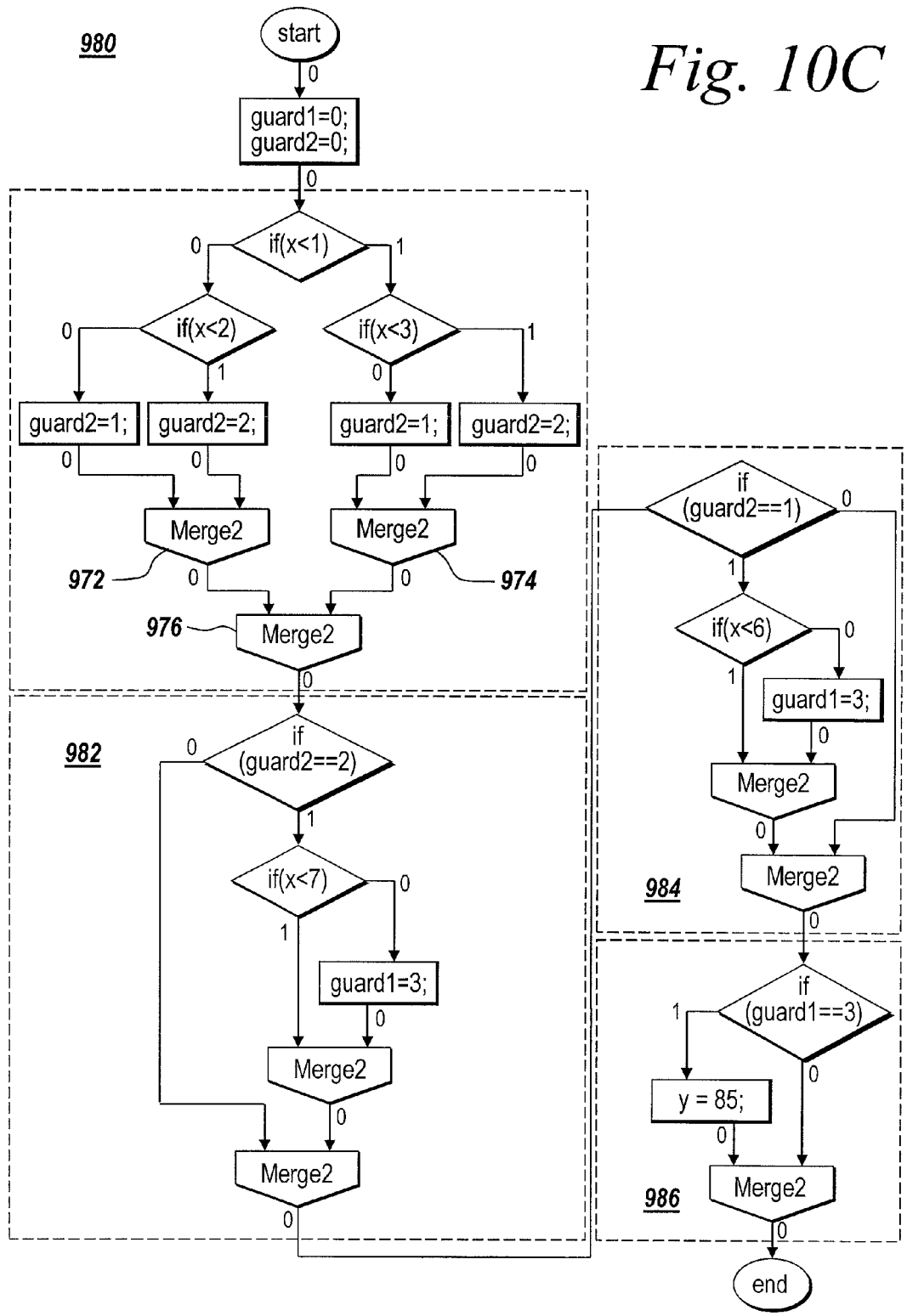

Illustrated in FIGS. 10A-C are further transformations that may be performed on the CFG of FIG. 9A. The next two MERGE nodes (910 and 912) may now be reached and the regions between them and Merge2 918 converted to a structured one. Guard variable "guard2" is introduced (950) and is set to different values, depending on the path to the MERGE nodes (see nodes 952, 954, 956, and 958). Code blocks are guarded using "guard2" guard variable (blocks from 964 to 966).

Two MERGE nodes may now be combined into one (FIG. 10B, node 970) and split again (972, 974 and 976). At this point, the graph consists of at least four SESE regions (980, 982, 984 and 986) and no unstructured elements. Code generated from it may be free from GOTO-like constructs. Alternatively, it may be possible to generate a HDL representation from this graph, because it is possible to represent this graph using IF/ELSE and SWITCH constructs, both present in HDL.

Although shown above are acyclic CFGs, some embodiments may be applicable to cyclic CFGs. In one embodiment of the invention, cyclic CFGs need not be identified beforehand, which may reduce processing time, and the process of identifying and structuring unstructured regions may proceed on cyclical CFGs as described above. In an alternative embodiment, different approaches may be taken with CFGs containing loops.

Various optimization, compilation and/or static analysis schemes may be applied to a CFG before, during or after processing it to structure the unstructured regions. Some embodiments of the invention may benefit from code or graph optimization techniques as known in the art or as designed by one of skill in the art.

In alternative embodiments, a CFG may be rewritten into a different representation prior, during or after identification of unstructured regions or processing unstructured regions into structured ones. In yet other embodiments, code generated from a CFG after restructuring may be in any of the industry-known or custom-designed textual or graphical languages, such as, for example C, Object C, C++, C#, Assembly, Java, Java bytecode, Javascript, VHDL, Verilog, Perl, Python, etc. A CFG may initially be generated from any of textual and/or graphical languages, including, but not limited to, array-based languages, dynamically typed languages, statically typed languages, etc. One applicable array-based language may be a language a subset of which is compatible with a MATLAB® programming environment.

Figure 11:
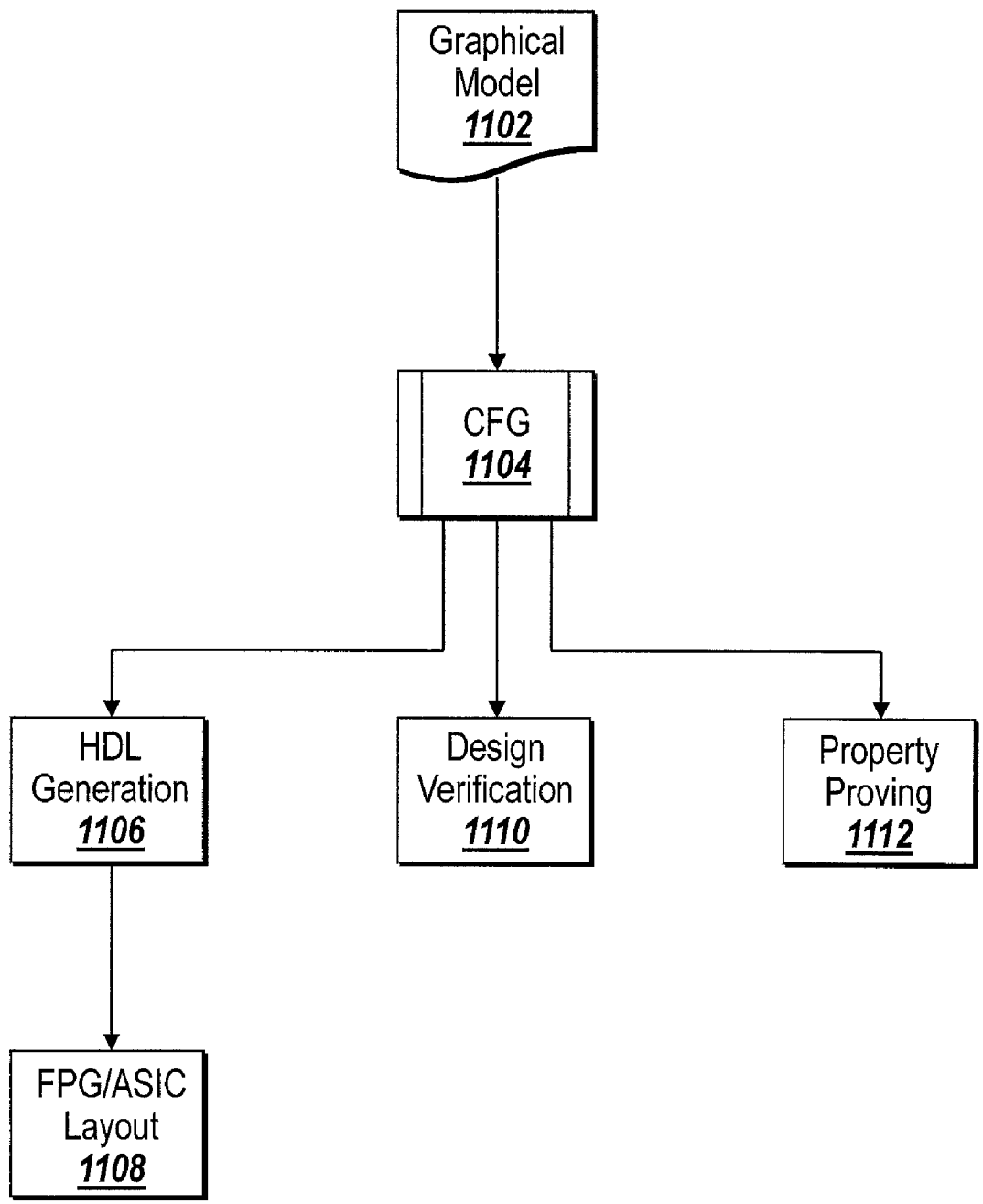
FIG. 11 is a schematic illustration of some of the possible uses of restructured CFGs.

FIG. 11 is a schematic illustration of some of the possible uses of restructured CFGs. A CFG may be generated from any number of textual and/or graphical models. As illustrated in FIG. 11, graphical model 1102 may be used as a source for a CFG, which is restructured to not contain unstructured regions (1104). The restructured CFG may be put to one or more of a number of uses. For example, the restructured CFG may be used to generate hardware layout by means of, for example a HDL representation such as Verilog and VHDL (1106), which may be used to generate FPGA or ASIC layout (1108), and general layout and/or organization of custom-made silicon hardware designs. The restructured CFG may also be used for model verification (1110) and model property proving (1112).

In an alternative embodiment, the generated hardware layout may itself be simulated in Simulink® modeling environment or any other modeling environment. In yet another embodiment of the invention, a restructured CFG or the process of restructuring may be used to make decisions about hardware-vs-software trade-offs. That is, parts of the generated code may be designated as best implemented in software, while other parts may be designated for hardware implementation; and hardware layout may be generated for those parts.

Figure 12A:
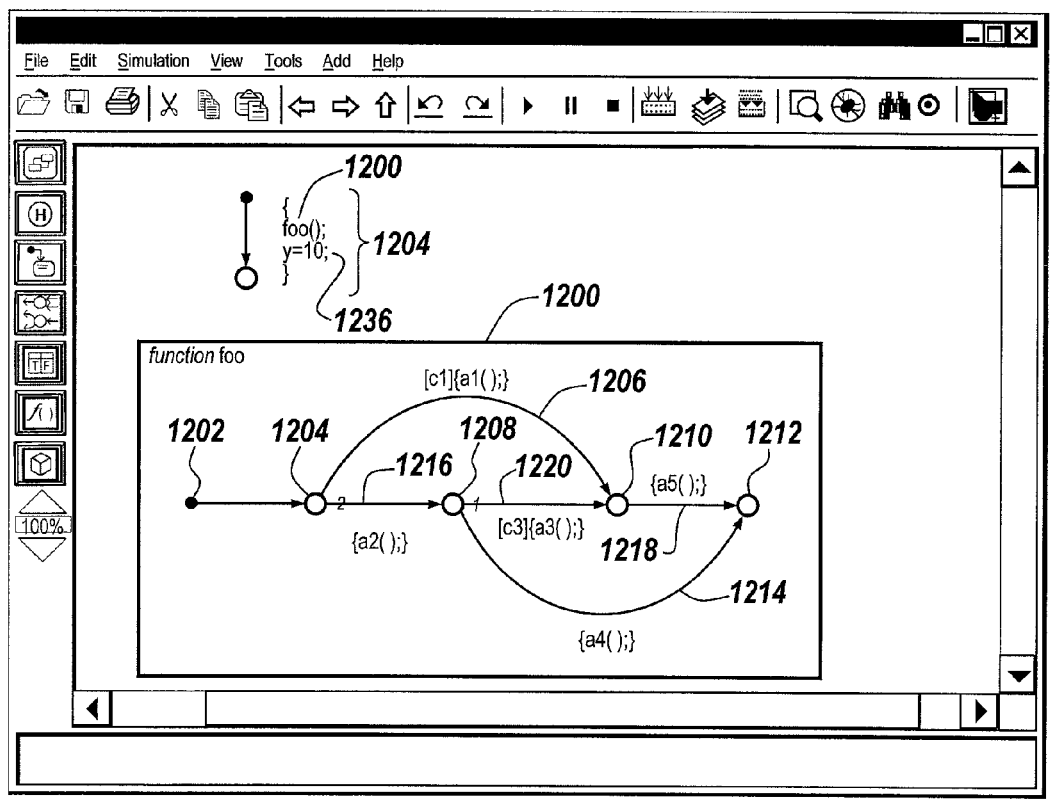

Shown in FIG. 12A is simple model 1201 in the Stateflow® modeling environment. As part of the transition that is executed each time the Stateflow® chart is evaluated, model 1201 calls function foo( ) 1200. Function 1200 itself is a relatively simple model with decision points (junctions) 1202, 1204, 1208, 1210, and 1212 and transitions between them, as shown. Transitions 1206 and 1216 from junction 1204 are chosen based on the value of variable $c_1$, and transitions 1220 and 1214 from junction 1208 are chosen based on the value of variable $c_3$.

Figure 12B:
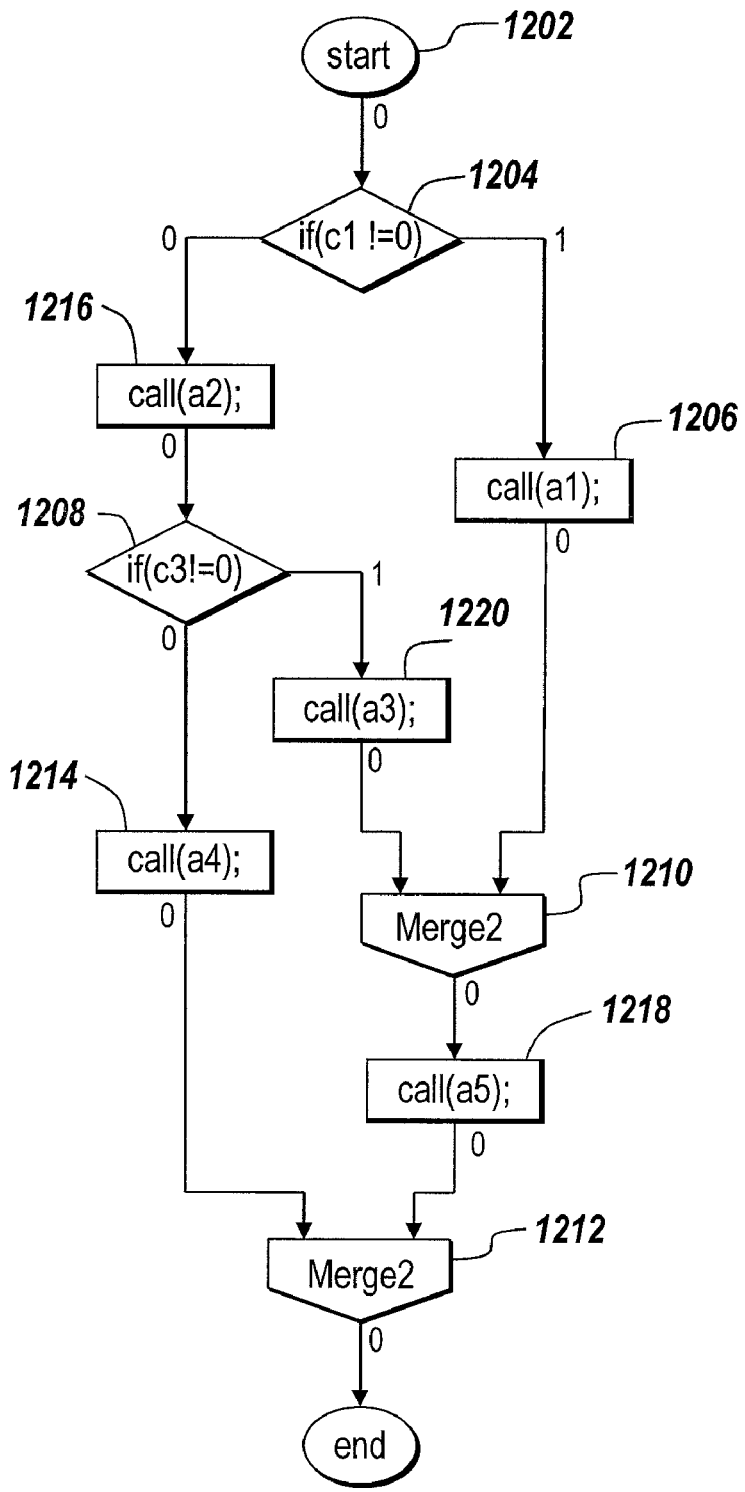

The control flow graph for model 1200 is shown in FIG. 12B. Junctions are labeled with the same numbers as in FIG. 12A where appropriate for ease of reference. Using the definition for finding unstructured regions above, it is possible to locate block 1218, located between two MERGE blocks 1210 and 1212. Referring now to FIG. 12C, it can be seen that this region indeed results in an unstructured code employing a GOTO statement (1232). Lines in FIG. 13C are labeled with similar numbers to FIGS. 12A and 12B where possible for ease of reference.

Figure 13A:
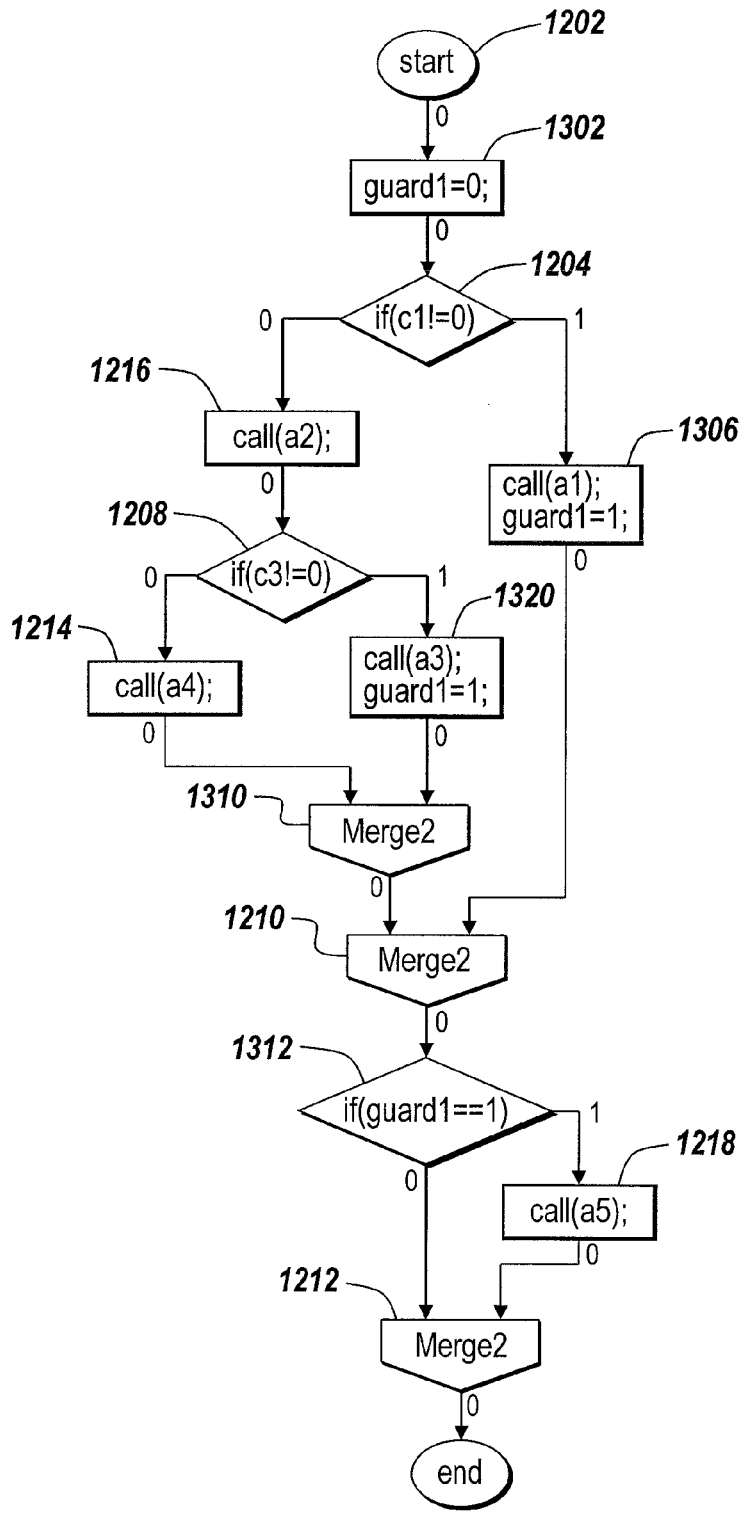

FIG. 13A is an illustration of the CFG of FIG. 12B after restructuring. Guard variable guard1 has been introduced and is initiated in block 1302. It is set to 1 on all paths that previously led to block 1218—namely, in blocks 1306 and 1320. The execution of block 1218 is now surrounded by the test of the guard variable (1312). No unstructured regions remain in the CFG, because blocks 1210, 1312, 1218, and 1212 may together be viewed as a single SESE region. FIG. 13B shows generated code corresponding to the CFG of FIG. 13A. There are no more GOTO or GOTO-like statements in the code. Instead, statements declaring and the guard variable (1302), setting it to a particular value (1306 and 1320) and testing it (1312) have been introduced, and command 1218 is executed within the IF block (1312).

In a similar manner, many models, both from the Stateflow® and other modeling environments may be used to generate structured code, where previously the generated code would have been unstructured. The resulting structured code may be used for many purposes and applications, as discussed above.

In one implementation, the graphical model may be a time-based block diagram. In one implementation, the time-based block diagram can be executed. In another implementation, the time-based block diagram may be processed before code is generated from it. This processing may include preparing data structures and/or evaluating parameters, configuring and/or propagating block characteristics, determining block connectivity, performing block reduction and block insertion, etc. During the configuration and propagation of block and/or port/signal characteristics, the so-called compiled attributes (such as dimensions, data types, complexity, sample time, etc.) of each block (and/or ports) may be setup on the basis of corresponding functional attributes and/or the attributes of blocks (and/or ports) that are connected to the given block through lines.

In one implementation, attribute setup is performed through a process during which block functional attributes "ripple through" the block diagram from one block to the next following signal connectivity (referred to herein as "propagation"). Blocks that are implemented to be compatible with a wide range of attributes may adapt their behavior in accordance with the attributes of the blocks connected to them.

Based on actual block connectivity (determined by, for example, removing blocks that have no functional bearing but only a graphical implication), the block diagram may be further optimized by performing block reduction and/or insertion. During this step, blocks may be inserted or a set of blocks may be removed or reduced to a single equivalent block. For example, a signal copy block may be automatically inserted in order to make contiguous memory copies of signals that are made up of disjoint memory sections.

The way in which blocks are interconnected in the block diagram may or may not represent an order in which the equations (execution methods) corresponding to the individual blocks will be solved (executed). In one implementation, an actual order is partially determined during the sorting step performed during compilation.

The first step in sorting may involve transforming the time-based block diagram into a compiled (in-memory) directed graph consisting of arcs and vertices. The vertices may be derived from some of the blocks that have a functional bearing. For instance, blocks with only a graphical implication and/or reduced blocks may not appear in the directed graph. The arcs represent data dependencies between the vertices and may correspond to the data dependencies in the block diagram. In addition, data dependencies are added to capture implicit dependencies. For example, in one implementation all inputs to a Function-Call subsystem are implicit data dependencies to the owner (caller) block. In another implementation, a portion of the inputs to a Function-Call subsystem are implicit data dependencies to the owner block. The graph is used to sort the blocks into a linear sorted list.

Sorting may also take into consideration user specified dependencies between the blocks such as priorities and placement groups. A block priority may specify the order in which the equations associated with a block are evaluated with respect to other blocks. Placement groups are a way of causing each class of block execution methods for a specified set of blocks to be "placed together" in the block method execution lists.

During the linking stage, block method execution lists may be derived from the sorted list to allow for execution of the block diagram. Each block method execution list is a list of block methods that are to be executed in a sequence when each execution method within the list has a sample hit. In multi-tasking mode, the lists may be further partitioned when block diagrams have blocks with different sample rates.

Those skilled in the art will recognize that while the block method execution lists are derived from the sorted list, they do not necessarily correspond one-to-one with the sorted lists because some blocks may not have a corresponding method and some block may have an "owner" block that triggers their execution.

The memory initialization of the model may include invoking block and model start, initialize, constant initialize, enable, and constant output methods. The simulation of the model may, include invoking block and model update, output, derivatives, zero-crossings methods.

Different embodiments may be implemented on various hardware and/or software systems, as deemed appropriate by one of skill in the art. Processing may be accomplished on a single processing unit or on multiple processing units, serially or in parallel. A processing unit may be a computer, a thread, a processor, a network of processing units, a core in a multi-core processor, a field programmable gate array (FPGA), a specially-designed hardware chip (e.g., an application specific integrated circuit (ASIC)), a general purpose computation chip (e.g., a microprocessor), a portable device, a biological computing device, an optical computing device, etc., and any combination of the above.

Some embodiments of the invention may be provided as a service, such as, for example, a web service or a distributed service. Some embodiments of the invention may make use of parallel or multiple processors, or be implemented on a supercomputer. Yet other embodiments of the invention may be employed with interpreted languages and process code as part of the execution.

Exemplary embodiments are discussed in detail above. While specific exemplary embodiments are discussed, it should be understood that this is done for illustration purposes only. In describing and illustrating the exemplary embodiments, specific terminology is employed for the sake of clarity. However, the exemplary embodiments are not intended to be limited to the specific terminology so selected. A person skilled in the relevant art will recognize that other components and configurations may be used without parting from the spirit and scope of the exemplary embodiments. It is to be understood that each specific element includes all technical equivalents that operate in a similar manner to accomplish a similar purpose. Each reference cited herein is incorporated by reference. The examples and embodiments described herein are non-limiting examples.

The invention claimed is:

1. A computer-implemented method of generating a structured control flow graph from a model, said method comprising:
   generating, using a computing device, a control flow graph from the model;
   identifying at least one unstructured region by locating at least one code block between two merge nodes in the control flow graph; and
   creating a structured region of the control flow graph by removing the functionality of the at least one code block from between the two merge nodes using a guard variable, the guard variable preventing execution of the at least one code block when a condition is satisfied.

2. The computer-implemented method of claim 1, wherein creating the structured region further comprises:
   surrounding the at least one code block with a test of the guard variable; and
   setting the guard variable to a predetermined value on every path that has led to the at least one located code block in the control flow graph.

3. The computer-implemented method of claim 2, wherein the test of the guard variable is a test for the predetermined value.

4. The computer-implemented method of claim 2, further comprising:
  setting the guard variable to a value different from the predetermined value on one or more paths leading to one or more of the two merge nodes.

5. The computer-implemented method of claim 1, wherein removing the functionality of the at least one block further comprises moving the at least one code block.

6. The computer-implemented method of claim 5, wherein moving the at least one code block further comprises:
  moving the at least one code block below the lower of the two merge nodes.

7. The computer-implemented method of claim 1, further comprising:
  merging the two merge nodes into a single merge node.

8. The computer-implemented method of claim 7, further comprising:
  splitting the single merge node into two or more merge nodes using optimal merge splitting rules.

9. The computer-implemented method of claim 1, wherein the control flow graph comprises single-entry single-exit nodes, except for merge nodes and conditional nodes.

10. The computer-implemented method of claim 9, wherein the control flow graph comprises at least one multiple-entry node or at least one multiple-exit node that is not a merge node or a conditional node.

11. The computer-implemented method of claim 10, further comprising:
  reorganizing the control flow graph into a control flow graph comprising single-entry single-exit nodes, except for merge nodes and conditional nodes.

12. The computer-implemented method of claim 1, wherein the structured region is functionally equivalent to the unstructured region.

13. The computer-implemented method of claim 1, further comprising:
  generating code from the control flow graph.

14. The computer-implemented method of claim 13, wherein generated code is in at least one or a combination of the following languages: C, C++, Javascript, Java bytecode, Assembly, or a hardware description language (HDL).

15. The computer-implemented method of claim 1, wherein the model is a graphical model.

16. The computer-implemented method of claim 1, wherein at least a subset of the model is written in a language a subset of commands of which is compatible with the MATLAB programming environment.

17. A computer-implemented system, said system comprising:
  a processor for executing:
    a modeling environment including a model;
    a first control flow graph created from the model, said control flow graph comprising at least one unstructured region including at least one code block between two merge nodes; and
    a control flow graph analyzer capable of converting the first control flow graph into a second control flow graph using a guard variable, the guard variable preventing execution of the at least one code block when a condition is satisfied.

18. The computer-implemented system of claim 17, wherein the second control flow graph further comprises the at least one code block located in a region different from the region between the two merge nodes and guarded by at least one guard variable, and wherein the second control flow graph is functionally equivalent to the first control flow graph.

19. The computer-implemented system of claim 17, further comprising:
  a code generator for generating code from the second control flow graph.

20. A computer-readable medium storing instructions for generating a structured control flow graph from a model, said instructions comprising:
  instructions for generating a control flow graph from the model;
  instructions for identifying at least one unstructured region by locating at least one code block between two merge nodes in the control flow graph; and
  instructions for creating a structured region of the control flow graph by removing the functionality of the at least one code block from between the two merge nodes using a guard variable, the guard variable preventing execution of the at least one code block when a condition is satisfied.

21. The computer-readable medium of claim 20, wherein instructions for creating the structured region further comprise:
  instructions for surrounding the at least one code block with a test of the guard variable; and
  instructions for setting the guard variable to a predetermined value on every path that has led to the at least one located code block in the control flow graph.

22. The computer-readable medium of claim 21, wherein the test of the guard variable is a test for the predetermined value.

23. The computer-readable medium of claim 20, further storing:
  instructions for merging the two merge nodes into a single merge node; and
  instructions for splitting the single merge node into two or more merge nodes using optimal merge splitting rules.

24. The computer-readable medium of claim 20, wherein the structured region is functionally equivalent to the unstructured region.

25. The computer-readable medium of claim 20, further storing:
  instructions for generating code from the control flow graph.

26. The computer-readable medium of claim 25, wherein generated code is in at least one or a combination of the following languages: C, Java bytecode, Assembly, or a hardware description language (HDL).

27. A computer-implemented system for generating a structured control flow graph from a model, said system comprising:
  a processor for:
  generating a control flow graph from the model;
  identifying at least one unstructured region by locating at least one code block between two merge nodes in the control flow graph; and
  creating a structured region of the control flow graph by removing the functionality of the at least one code block from between the two merge nodes using a guard variable, the guard variable preventing execution of the at least one unstructured region when a condition is satisfied.

* * * * *